(12) United States Patent
Kim et al.

(10) Patent No.: US 11,929,059 B2
(45) Date of Patent: Mar. 12, 2024

(54) METHOD, DEVICE, AND COMPUTER READABLE STORAGE MEDIUM FOR TEXT-TO-SPEECH SYNTHESIS USING MACHINE LEARNING ON BASIS OF SEQUENTIAL PROSODY FEATURE

(71) Applicant: NEOSAPIENCE, INC., Seoul (KR)

(72) Inventors: Taesu Kim, Suwon-si Gyeonggi-do (KR); Younggun Lee, Seoul (KR)

(73) Assignee: NEOSAPIENCE, INC., Seoul (KR)

( * ) Notice: Subject to any disclaimer, the term of this patent is extended or adjusted under 35 U.S.C. 154(b) by 852 days.

(21) Appl. No.: 17/004,460

(22) Filed: Aug. 27, 2020

(65) Prior Publication Data
US 2020/0394998 A1    Dec. 17, 2020

Related U.S. Application Data

(63) Continuation of application No. PCT/KR2019/009659, filed on Aug. 2, 2019.

(30) Foreign Application Priority Data

Aug. 2, 2018   (KR) .................. 10-2018-0090134
Aug. 1, 2019   (KR) .................. 10-2019-0094065

(51) Int. Cl.
*G10L 13/10*        (2013.01)
*G06N 3/08*         (2023.01)
(Continued)

(52) U.S. Cl.
CPC .............. *G10L 13/10* (2013.01); *G06N 3/08* (2013.01); *G06N 20/00* (2019.01); *G10L 13/027* (2013.01); *G10L 13/04* (2013.01)

(58) Field of Classification Search
CPC ....... G10L 13/10; G10L 13/04; G10L 13/027; G06N 20/00; G06N 3/08
See application file for complete search history.

(56) References Cited

U.S. PATENT DOCUMENTS

2019/0172443 A1*  6/2019  Shechtman ........... G10L 13/047
2019/0348020 A1* 11/2019  Clark .................... G06N 3/047
(Continued)

FOREIGN PATENT DOCUMENTS

JP       2006227589 A     8/2006
KR    1020070090745 A     9/2007
(Continued)

OTHER PUBLICATIONS

Wang, Yuxuan, et al. "Tacotron: Towards end-to-end speech synthesis." arXiv preprint arXiv:1703.10135 (2017). (Year: 2017).*
(Continued)

*Primary Examiner* — Brian L Albertalli
(74) *Attorney, Agent, or Firm* — Dinsmore & Shohl LLP; Yongsok Choi, Esq.

(57) ABSTRACT

The present disclosure relates to a text-to-speech synthesis method using machine learning based on a sequential prosody feature. The text-to-speech synthesis method includes receiving input text, receiving a sequential prosody feature, and generating output speech data for the input text reflecting the received sequential prosody feature by inputting the input text and the received sequential prosody feature to an artificial neural network text-to-speech synthesis model.

13 Claims, 11 Drawing Sheets

(51) Int. Cl.
*G06N 20/00* (2019.01)
*G10L 13/027* (2013.01)
*G10L 13/04* (2013.01)

(56) References Cited

U.S. PATENT DOCUMENTS

2020/0380949 A1* 12/2020 Wu .................. G10L 13/00
2021/0256961 A1* 8/2021 Garman ............ G06N 3/08

FOREIGN PATENT DOCUMENTS

KR 1020170107683 A 9/2017
KR 1020180071029 A 6/2018

OTHER PUBLICATIONS

Tran, Trang, et al. "Parsing speech: a neural approach to integrating lexical and acoustic-prosodic information." arXiv preprint arXiv:1704.07287 (2017). (Year: 2017).*

Wang, Yuxuan, et al. "Uncovering latent style factors for expressive speech synthesis." arXiv preprint arXiv:1711.00520 (2017). (Year: 2017).*

Baggia, Paolo, et al. "Speech synthesis markup language (SSML) version 1.1." World Wide Web Consortium, Recommendation REC-speechsynthesis 11-20100907 (2010). (Year: 2010).*

R. J. Skerry-Ryan, et al., "Towards End-to-End Prosody Transfer for Expressive Speech Synthesis with Tacotron," Journal, Proceedings of the 35th International Conference on Machine Learning, Mar. 24, 2018, Stockholm, Sweden.

Sercan Ö. Arik, et al., "Deep Voice 2: Multi-Speaker Neural Text-to-Speech," Journal, 31st Conference on Neural Information Processing Systems (NIPS), Sep. 20, 2017, Long Beach, CA, USA.

Vincent Wan, et al., "CHiVE: Varying Prosody in Speech Synthesis with a Linguistically Driven Dynamic Hierarchical Conditional Variational Network", Proceedings of the 36th International Conference on Machine Learning, May 17, 2019, PLMR vol. 97, pp. 3331-3340.

Yi Liu, et al., "Speaker Embedding Extraction with Phonetic Information", Proc. Interspeech, Jun. 14, 2018, pp. 2247-2251.

Yuxuan Wang, et al., "Style Tokens: Unsupervised Style Modeling, Control and Transfer in End-to-End Speech Synthesis", Proceedings of the 35 th International Conference on Machine Learning, Stockholm, Sweden, Mar. 23, 2018, PMLR vol. 80, pp. 5180-5189.

International Search Report of PCT/KR2019/009659 dated Nov. 7, 2019.

Xin Wang, et al., "Investigation of Using Continuous Representation of Various Linguistic Units in Neural Network Based Text-to-Speech Synthesis", IEICE Transactions on Information and Systems, pp. 2471-2474, vol. E-99-D, No. 10. Oct. 2016.

\* cited by examiner

METHOD, DEVICE, AND COMPUTER READABLE STORAGE MEDIUM FOR TEXT-TO-SPEECH SYNTHESIS USING MACHINE LEARNING ON BASIS OF SEQUENTIAL PROSODY FEATURE

CROSS-REFERENCE TO RELATED APPLICATION

This application is a continuation of International Application No. PCT/KR2019/009659 filed on Aug. 2, 2019 which claims priority to Korean Patent Application No. 10-2018-0090134 filed on Aug. 2, 2018 and Korean Patent Application No. 10-2019-0094065 filed on Aug. 1, 2019, the entire contents of which are herein incorporated by reference.

TECHNICAL FIELD

The present disclosure relates to a method and system for text-to-speech synthesis using machine learning based on a sequential prosody feature. More specifically, the present disclosure relates to a method and system of inputting the sequential prosody feature to an artificial neural network text-to-speech synthesis model, so as to generate an output speech text for the input text reflecting the sequential prosody feature.

BACKGROUND ART

Generally, speech synthesis technology which is called text-to-speech synthesis technology (TTS; text-to-speech) is a technology used to reproduce a necessary speech without pre-recording an actual speech in an application requiring a human speech such as an announcement, navigation, artificial intelligence (AI) assistance, etc. As a typical speech synthesis method, there are Concatenative TTS in which a speech is divided and stored in very short units such as phonemes and phonemes forming a sentence to be synthesized are combined to synthesize a speech and Parametric TTS in which speech features are represented by parameters and a speech corresponding to a sentence to be synthesized is synthesized from parameters expressing speech features constituting the sentence by means of a vocoder.

Recently, an artificial neural network-based speech synthesis method has been actively studied, and a speech synthesized according to this speech synthesis method includes more natural speech features than those of conventional methods. However, in the conventional speech synthesis method, since only the prosody feature having a pre-fixed length is applied regardless of the length of the input text or the length of a reference speech, the prosody of the synthesized speech at a specific point in time cannot be controlled. This is because, when the feature having a fixed length is forcibly applied to the reference speech, the probability of loss of information in time is quite high. Accordingly, the conventional speech synthesis method has not been able to finely control the prosody for the synthesized speech in order to accurately express people's intentions or emotions.

In addition, when the difference between the pitch range of the source speaker and the pitch of the target speaker is large, it may be difficult to reflect the prosody feature of the source speaker to the target speaker. For example, when the source speaker is a female and the target speaker is a male, synthesizing the source speaker's prosody into the target speaker's speech may result in the synthesized speech of the target speaker having a higher pitch than the normal pitch. Considering such circumstances, it may be required to pre-process the prosody feature before applying the prosody feature to the artificial neural network model in order to improve the quality of the synthesized speech in which the prosody feature is reflected.

SUMMARY

Technical Problem

In order to solve the problems described above, the method and apparatus according to the present disclosure may generate output speech data for the input text in which a sequential prosody feature having a prosody feature according to time is reflected.

In addition, the method and apparatus according to the present disclosure may input a sequential prosody feature to at least one of an encoder and a decoder of the artificial neural network text-to-speech synthesis model, and an attention module may be used to match a variable length of the sequential prosody feature to the length of the input text and/or the length of the synthesized speech.

In addition, the method and apparatus according to the present disclosure may normalize a plurality of embedding vectors corresponding to the sequential prosody feature, and apply the plurality of normalized embedding vectors to the artificial neural network text-to-speech synthesis model.

Technical Solution

The present disclosure may be implemented in various ways, including a computer readable storage medium that stores a method, a system, an apparatus, or instructions.

According to one embodiment of the present disclosure, a text-to-speech synthesis method using machine learning based on a sequential prosody feature may include receiving an input text, receiving a sequential prosody feature, and generating output speech data for the input text reflecting the received sequential prosody feature by inputting the input text and the received sequential prosody feature to an artificial neural network text-to-speech synthesis model.

According to one embodiment of the present disclosure, in the text-to-speech synthesis method, the artificial neural network text-to-speech synthesis model may be generated by performing machine learning based on a plurality of learning texts and data representing learning speeches corresponding to the plurality of learning texts, and the data representing the learning speeches may include a sequential prosody feature of the learning speeches.

According to one embodiment of the present disclosure, in the text-to-speech synthesis method, the sequential prosody feature may include a prosody information corresponding to at least one unit of a frame, character, phoneme, syllable, or word in chronological order, and wherein the prosody information may include at least one of information on a volume of the sound, information on a pitch of the sound, information on a length of the sound, information on a pause duration of the sound, or information on a style of the sound.

According to one embodiment of the present disclosure, in the text-to-speech synthesis method, receiving the sequential prosody feature may include receiving a plurality of embedding vectors representing the sequential prosody feature, and wherein each of the plurality of embedding vectors may correspond to the prosody information included in chronological order.

According to one embodiment of the present disclosure, in the text-to-speech synthesis method, the artificial neural network text-to-speech synthesis model may include an encoder and a decoder, and wherein the text-to-speech synthesis method may further include inputting the received plurality of embedding vectors to an attention module to generate a plurality of converted embedding vectors corresponding to respective parts of the input text provided to the encoder, in which the lengths of the plurality of converted embedding vectors may vary with the length of the input text, and wherein generating the output speech data for the input text may include inputting the generated plurality of converted embedding vectors to the encoder of the artificial neural network text-to-speech synthesis model and generating output speech data for the input text reflecting the plurality of converted embedding vectors.

According to one embodiment of the present disclosure, in the text-to-speech synthesis method, the artificial neural network text-to-speech synthesis model may include an encoder and a decoder, and wherein generating the output speech data for the input text may include inputting the received plurality of embedding vectors to the decoder of the artificial neural network text-to-speech synthesis model and generating output speech data for the input text reflecting the plurality of embedding vectors.

According to one embodiment of the present disclosure, the text-to-speech synthesis method may further include receiving an articulatory feature of a speaker, wherein generating output speech data for the input text may include generating output speech data for the input text, which simulates speech of the speaker and reflects a plurality of embedding vectors representing the sequential prosody feature.

According to one embodiment of the present disclosure, in the text-to-speech synthesis method, wherein receiving an articulatory feature of a speaker may include receiving a sequential prosody feature of the speaker, wherein receiving the plurality of embedding vectors may include normalizing the received plurality of embedding vectors based on the sequential prosody feature of the speaker, and wherein generating the output speech data for the input text may include generating the output speech data for the input text, which simulates the speech of the speaker and reflects the normalized plurality of embedding vectors.

According to one embodiment of the present disclosure, in the text-to-speech synthesis method, wherein normalizing the received embedding vectors may include calculating an average value of embedding vectors representing the sequential prosody feature of the speaker at each time-step, and subtracting the received plurality of embedding vectors by the average value of the embedding vectors calculated at each time-step.

According to one embodiment of the present disclosure, in the text-to-speech synthesis method, wherein receiving the sequential prosody feature may include receiving prosody information on at least a part of the input text through a user interface, and wherein generating the output speech data for the input text reflecting the received sequential prosody feature may include generating output speech data for the input text reflecting the prosody information on at least a part of the input text.

According to one embodiment of the present disclosure, the prosody information on at least a part of an input text may be input through a tag provided in a speech synthesis markup language.

According to one embodiment of the present disclosure, the text-to-speech synthesis method may further include receiving prosody information on at least a part of the input text through a user interface, and changing the received sequential prosody feature based on the prosody information on at least a part of the received input text, and wherein generating the output speech data for the input text reflecting the received sequential prosody feature may include generating output speech data for the input text reflecting the changed sequential prosody feature.

According to one embodiment of the present disclosure, the prosody information on the at least a part of an input text, which is used to change the received sequential prosody feature, may be input through a tag provided in a speech synthesis markup language.

In addition, a program for implementing the text-to-speech synthesis method using machine learning based on a sequential prosody feature as described above may be recorded in a computer readable recording medium.

Further, an apparatus, technical means, etc. associated with the text-to-speech synthesis method using machine learning based on a sequential prosody feature as described above may also be disclosed.

Effects of the Disclosure

According to some embodiments of the present disclosure, text-to-speech synthesis method using machine learning is provided based on a variable-length sequential prosody feature including prosody information over time, so that the prosody of the synthesized speech can be finely controlled, and it is possible to more accurately communicate the intention or emotion of a person through speech synthesis.

According to some embodiments of the present disclosure, when applying the variable-length sequential prosody feature to at least one of an encoder and a decoder of an artificial neural network text-to-speech synthesis model, by using the attention, the sequential prosody feature can be adjusted to correspond to the length of the input text and/or the synthesized speech so that the variable-length sequential prosody feature can be effectively applied to the input text and/or the synthesized speech regardless of the length thereof.

According to some embodiments of the present disclosure, before applying the sequential prosody feature to the artificial neural network text-to-speech synthesis model, a pre-processing of normalizing a plurality of embedding vectors corresponding to the sequential prosody feature is performed, and accordingly, when one person's prosody feature is applied to another person's synthesized speech, the quality of the synthesized speech reflecting the prosody feature can be further improved.

DESCRIPTION OF DRAWINGS

Embodiments of the present disclosure will be described with reference to the accompanying drawings described below, where similar reference numerals indicate similar elements, but are not limited thereto.

DETAILED DESCRIPTION

Figure 1:
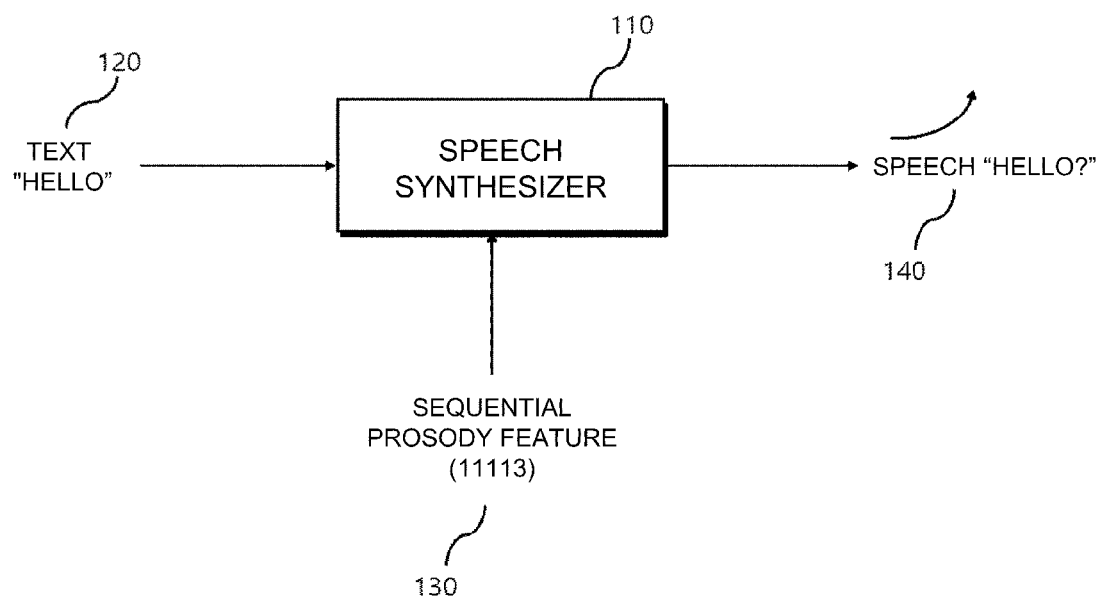
FIG. 1 is an exemplary view showing a process by a speech synthesizer of receiving an input text and a sequential prosody feature and outputting a synthesized speech according to an embodiment of the present disclosure.

Advantages and features of the disclosed embodiments and methods of accomplishing the same will be apparent by referring to embodiments described below in connection with the accompanying drawings. The present disclosure may, however, be embodied in different forms and should not be construed as limited to the embodiments set forth herein. Rather, these embodiments are provided so that this disclosure will be thorough and complete and will fully convey the scope of the present disclosure to those skilled in the art.

Terms used herein will be briefly described, and disclosed embodiments will be described in detail below.

The terms used herein have been selected as general terms which are widely used at present in consideration of the functions of the present disclosure, and this may be altered according to the intent of an operator skilled in the art, conventional practice, or introduction of new technology. Also, in a specific case, a term is arbitrarily selected by the applicant, and a meaning of the term will be described in detail in a corresponding part of the description of the exemplary embodiments. Therefore, the terms used herein should be defined based on the overall content of the present disclosure instead of a simple name of each of the terms.

As used herein, the singular forms "a," "an," and "the" are intended to include the plural forms as well unless the context clearly indicates the singular forms. Also, the plural forms are intended to include the singular forms as well, unless the context clearly indicates the plural forms.

As used throughout herein, when one part is referred to as "comprising" (or "including" or "having") other elements, the part can comprise (or include or have) only those elements or other elements as well as those elements unless specifically described otherwise.

Furthermore, the term "unit" or "module" used herein denotes a software or hardware element, and the "unit" or "module" performs certain roles. However, the meaning of the "unit" or "module" is not limited to software or hardware. The "unit" or "module" may be configured to be in an addressable storage medium or to execute one or more processors. Accordingly, as an example, the "unit" or "module" includes elements such as software elements, object-oriented software elements, class elements, and task elements, processes, functions, attributes, procedures, subroutines, program code segments, drivers, firmware, micro-codes, circuits, data, database, data structures, tables, arrays, and variables. Furthermore, functions provided in the elements and the "units" or "modules" may be combined as a smaller number of elements and "units" or "modules", or further divided into additional elements and "units" or "modules".

According to an embodiment of the present disclosure, the "unit" or "module" may be implemented as a processor and a memory. The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application-specific integrated circuit (ASIC), a programmable logic device (PLD), a field-programmable gate array (FPGA), etc. The term "processor" may refer to a combination of processing devices, e.g., a combination of a DSP and a microprocessor, a plurality of microprocessors, one or more microprocessors in conjunction with a DSP core, or any other combination of such configurations.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

In the present disclosure, the sequential prosody feature may include prosody information corresponding to at least one unit among frame, phoneme, text, syllable, or word in chronological order. In an example, the prosody information may include at least one of information on the volume of the sound, information on the pitch of the sound, information on the length of the sound, information on the pause duration of the sound, or information on the style of the sound. In addition, the style of the sound may include any form, manner, or nuance that the sound or speech expresses, and may include, for example, tone, intonation, emotion, etc.

inherent in the sound or speech. Also, the sequential prosody feature may be represented by a plurality of embedding vectors, and each of the plurality of embedding vectors may correspond to prosody information included in chronological order.

Hereinafter, exemplary embodiments will be fully described with reference to the accompanying drawings in such a way that those skilled in the art can easily carry out the embodiments. Further, in order to clearly illustrate the present disclosure, parts not related to the description are omitted in the drawings.

FIG. 1 is an exemplary view showing a process by a speech synthesizer 110 of receiving an input text 120 and a sequential prosody feature 130 and outputting a synthesized speech 140 according to an embodiment of the present disclosure. The speech synthesizer 110 may be configured to output a synthesized speech for the input text using an artificial neural network text-to-speech synthesis model. In this example, the artificial neural network text-to-speech synthesis model may be a single artificial neural network text-to-speech synthesis model. In an embodiment, the speech synthesizer 110 may correspond to a data recognition unit 455 of FIG. 4 and/or a data recognition unit 1020 of FIG. 10. In addition, the speech synthesizer 110 may be included or provided in a user terminal or a text-to-speech synthesis system.

According to an embodiment, a text input to the speech synthesizer 110 may include a text received through an arbitrary interface (not shown). According to another embodiment, a speech recognition unit (not shown) may receive a specific speech, convert it into a character corresponding to the input speech, and provide the converted character to the speech synthesizer 110 as an input text. Accordingly, as shown in FIG. 1, the speech synthesizer 110 may receive the text "HELLO" as a text input through an interface or a speech recognition unit.

According to an embodiment, the speech synthesizer 110 may be configured to receive a sequential prosody feature. In this example, the sequential prosody feature may include prosody information of each time unit according to a predetermined time unit. As shown in FIG. 1, the sequential prosody feature may include information on the pitch of the sound, and include information "11113" indicating a pitch over time, for example. According to an embodiment, this sequential prosody feature may be extracted or determined from any extractor capable of extracting a prosody feature for sound, and may be extracted from a pitch tracker, for example. According to another embodiment, the speech synthesizer 110 may receive any information indicating sequential prosody information about the sound, such as information indicated by the sheet music, for example. According to another embodiment, the speech synthesizer 110 may receive the sequential prosody feature corresponding to attribute values represented in a speech synthesis markup language over time for a text input from an arbitrary device. This attribute values will be described in detail below with reference to FIG. 9.

The speech synthesizer 110 may be configured to generate output data for the input text reflecting the received sequential prosody feature. To this end, the speech synthesizer 110 may apply prosody information according to the time sequence indicated by the sequential prosody feature to the input text. For example, as shown in FIG. 1, the speech synthesizer 110 may generate output speech data by reflecting "11113", which is the received information representing a pitch over time, in the input text "HELLO". That is, the speech synthesizer 110 may generate an output speech corresponding to the interrogative text "HELLO?", in which the pitch of "O," the last character of the input text, is raised to be higher than the other characters. The speech thus generated may be output through an output device such as a speaker device or the like, or transmitted to another device having an I/O device.

Figure 2:
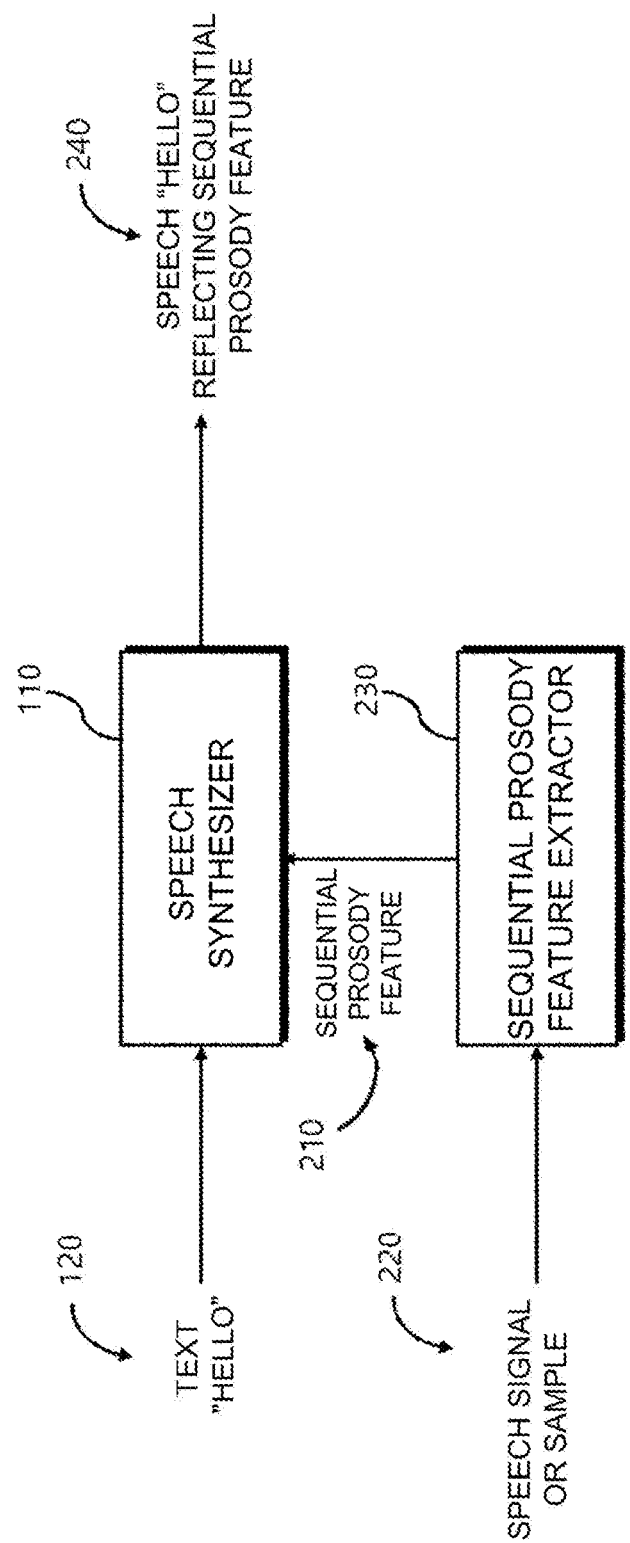
FIG. 2 is an exemplary view showing a process by a speech synthesizer of outputting a synthesized speech using a sequential prosody feature extracted from a sequential prosody feature extractor and an input text according to an embodiment of the present disclosure.

FIG. 2 is an exemplary view showing a process by a speech synthesizer 110 of outputting a synthesized speech 240 using a sequential prosody feature 210 extracted from the sequential prosody feature extractor 230 and the input text 120 according to an embodiment of the present disclosure. In an embodiment, the sequential prosody feature extractor 230 may correspond to a sequential prosody feature extraction unit 410 of FIG. 4. Since the input text 120 and the speech synthesizer 110 have been described with reference to FIG. 1, redundant description thereof will be omitted.

According to an embodiment, the sequential prosody feature extractor 230 may receive a speech signal or sample 220 and extract a sequential prosody feature 210 from the received speech signal or sample. In this example, the received speech signal or sample may include speech spectrum data representing information related to the sequential prosody feature 210, and may include melody, speech of a specific speaker, etc., for example.

According to an embodiment, in extracting the sequential prosody feature 210, any known suitable feature extraction method capable of extracting the sequential prosody feature 210 from the speech signal or sample 220 may be used. According to an embodiment, an artificial neural network or a machine learning model may be used to extract the sequential prosody feature. For example, the artificial neural network or the machine learning model used for the sequential prosody feature extractor 230 may be formed of any one of various artificial neural network models including a recurrent neural network (RNN), a long short-term memory model (LSTM), a deep neural network (DNN), and a convolution neural network (CNN), etc., or a combination thereof.

The sequential prosody feature extractor 230 may input the received speech signal or sample into the artificial neural network prosody feature model and extract a plurality of feature vectors (embedding vectors) representing the sequential prosody feature 210. In this example, each of the plurality of embedding vectors may correspond to a predetermined time unit (e.g., frame, phoneme, character, syllable, word, etc.). For example, the vector may include one of various speech feature vectors, such as mel frequency cepstral coefficient (MFCC), linear predictive coefficients (LPC), perceptual linear prediction (LPP), etc., but not limited thereto. In addition, since the plurality of embedding vectors extracted as described above includes prosody features or information according to time sequence, the lengths of these vectors may be variable or different from each other depending on the length of the input speech sample.

Figure 3:
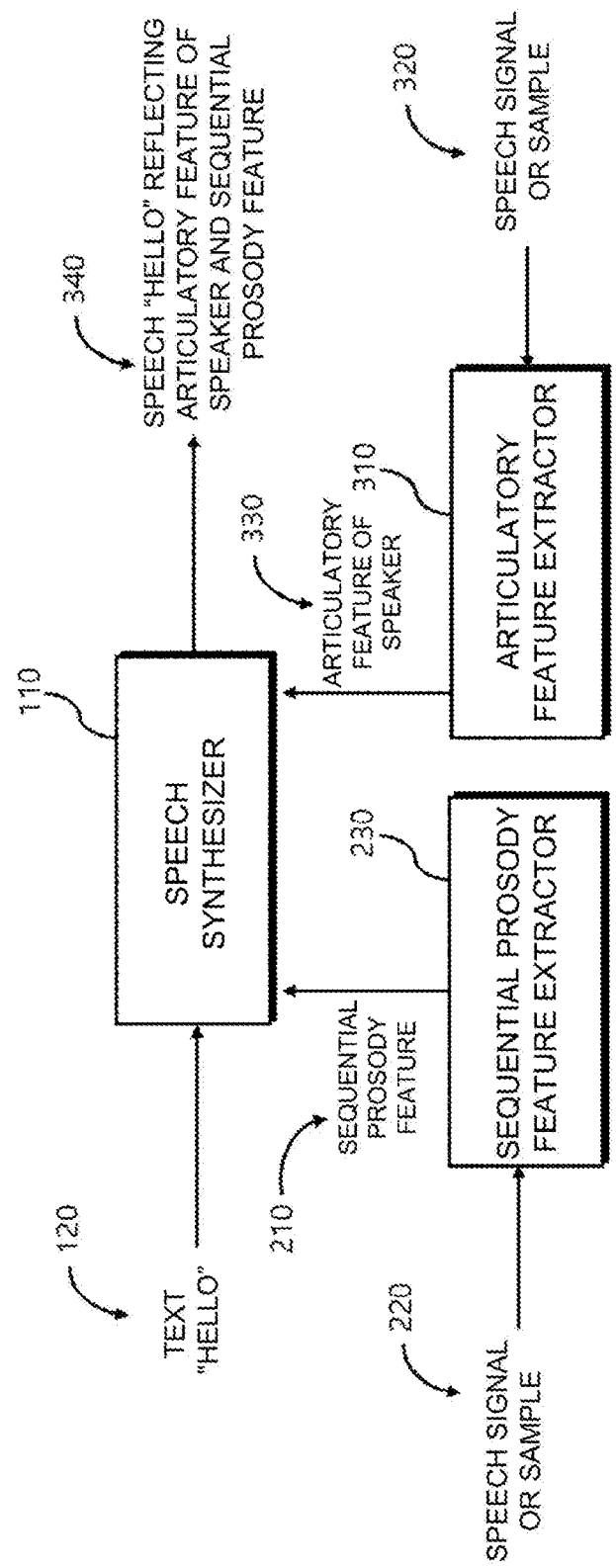
FIG. 3 is an exemplary view showing a process by a speech synthesizer of applying a sequential prosody feature and an articulatory feature of a speaker to an input text and outputting a synthesized speech according to an embodiment of the present disclosure.

The speech synthesizer 110 may generate speech output data by reflecting the sequential prosody feature 210 extracted from the sequential prosody feature extractor 230 in the received text 120. For example, the speech synthesizer 110 may input the embedding information corresponding to the inputted text "HELLO" and a plurality of embedding vectors extracted by the sequential prosody feature extractor 230 into the artificial neural network text-to-speech synthesis model and generate "HELLO" speech data reflecting the sequential prosody features. The speech thus generated may be output through an output device such as a speaker device or the like, or transmitted to another device having an I/O device. FIG. 3 is a schematic diagram of the speech synthesizer 110 that applies the sequential prosody feature 210 and an articulatory feature 330 of the speaker to the input text 120 and outputs a synthesized speech, according to an embodiment of the present disclosure. As shown in FIG. 3, the speech synthesizer 110 may receive the input text 120, the sequential prosody feature 210, and the articulatory feature 330 of the speaker. In this example, the sequential prosody feature 210 may be extracted from the sequential prosody feature extractor 230 based on the speech signal or sample 220, and the articulatory feature 330 of the speaker may be extracted from the articulatory feature extractor 310 of the speaker based on a speech signal or sample 320. According to an embodiment, the speech signal or sample 220 input to the sequential prosody feature extractor 230 may be different from the speech signal or sample 320 input to the articulatory feature extractor 310. In other embodiments, the two speech signals or samples 220 and 320 may be the same as each other. Since the speech synthesizer 110, the input text 120, the sequential prosody feature 210, the speech signal or sample 220, and the sequential prosody feature extractor 230 have been described above with reference to FIGS. 1 and 2, redundant description thereof will be omitted.

The articulatory feature extractor 310 may be configured to extract an articulatory feature of the speaker from the speech data. The articulatory feature of the speaker may not only simulate the speaker's speech, but may also include at least one of various elements such as style, prosody, emotion, tone, and pitch that may form the speech. According to an embodiment, the articulatory feature of the speaker may include a one-hot speaker ID-vector representing the speaker. According to another embodiment, the articulatory feature of the speaker may include an embedding vector representing the articulatory feature of the speaker. In an embodiment, the articulatory feature extractor 310 may correspond to the articulatory feature extraction unit 415 of FIG. 4.

The speech synthesizer 110 may input the input text 120, the sequential prosody feature 210, and the articulatory feature 330 of the speaker to the artificial neural network text-to-speech synthesis model and generate the output speech 340. The output speech 340 may include output speech data for the input text 120 in which the sequential prosody feature 210 and the articulatory feature 330 of the speaker are reflected. That is, the output speech 340 may be data synthesized into a speech that the speaker speaks the input text 120 with the input sequential prosody feature 210, by simulating the speaker's speech based on the articulatory feature of the speaker and reflecting the sequential prosody feature 210. For example, when the sequential prosody feature 210 and the articulatory feature 330 of the speaker are respectively extracted from the speech of the first speaker and the second speaker different from the first speaker, a speech saying "HELLO" may be output in the voice of the second speaker based on the prosody information according to the time of the second speaker. The speech thus generated may be output through an output device such as a speaker device or the like, or transmitted to another device having an I/O device.

FIGS. 2 and 3 show that the speech synthesizer 110 receives a plurality of embedding vectors over time representing the sequential prosody feature 210 extracted from the sequential prosody feature extractor 230, but the present disclosure is not limited thereto, and the speech synthesizer 110 may receive, through an I/O device (not shown), input values for a plurality of embedding vectors over time representing the sequential prosody feature 210. Alternatively, a plurality of embedding vectors over time representing the sequential prosody feature 210 may be stored in advance in a storage medium (not shown), and the speech synthesizer 110 may access the storage medium and receive a plurality of embedding vectors. In addition, modification information on a plurality of embedding vectors extracted or stored as described above may be received through an I/O device, a plurality of embedding vectors may be modified according to the received modification information, and the plurality of modified embedding vectors may be received by the speech synthesizer 110.

Figure 4:
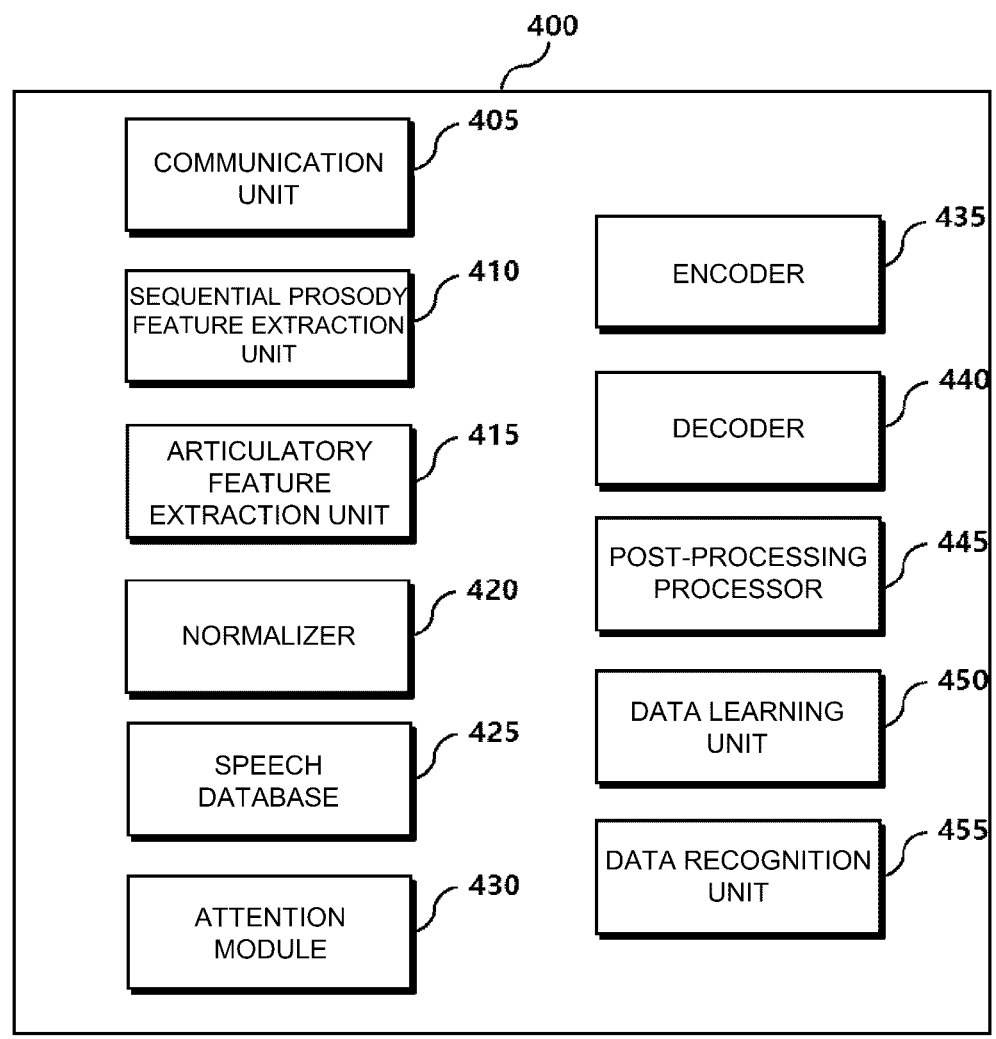
FIG. 4 is a block diagram of a text-to-speech synthesis system according to an embodiment of the present disclosure.

In addition, FIG. 3 shows that the articulatory feature 330 of the speaker is extracted by the articulatory feature extractor 310 and is provided to the speech synthesizer 110, but the present disclosure is not limited thereto, and the speech synthesizer 110 may receive input values for the embedding vectors representing the articulatory feature through an I/O device (not shown). Alternatively, the embedding vector representing the articulatory feature may be stored in advance in a storage medium (not shown), and the speech synthesizer 110 may access the storage medium and receive the embedding vector representing the articulatory feature. In addition, the modification information on the articulatory feature extracted or stored as described above may be received through the I/O device, an embedding vector representing the articulatory feature may be modified according to the received information, and an embedding vector representing the modified articulatory feature may be received by the speech synthesizer 110. FIG. 4 is a block diagram showing a text-to-speech synthesis system 400 according to an embodiment of the present disclosure. The text-to-speech synthesis system 400 includes a communication unit 405, a sequential prosody feature extraction unit 410, an articulatory feature extraction unit 415, a normalizer 420, a speech database 425, an attention module 430, an encoder. 435, a decoder 440, a post-processing processor 445, a data learning unit 450, and a data recognition unit 455. The communication unit 405 may be configured to allow the text-to-speech synthesis system 400 to transmit and receive signals or data to and from external devices. The external device may include a user terminal that provides a text-to-speech synthesis service. Alternatively, the external device may include other text-to-speech synthesis systems. In addition, the external device may be any device including a speech database.

According to an embodiment, the communication unit 405 may be configured to receive a text from an external device. In this example, the text may include a learning text to be used for training the artificial neural network text-to-speech synthesis model. Alternatively, the text may include an input text to be used to generate a synthesized speech through an artificial neural network text-to-speech synthesis model. This text may be provided to at least one of the speech database 425, the encoder 435, the decoder 440, the data learning unit 450, and the data recognition unit 455.

The communication unit 405 may be configured to receive a speech signal or sample through an external device. According to an embodiment, the speech signal or sample is transmitted to the sequential prosody feature extraction unit 410, so that the sequential prosody feature may be extracted from the speech signal or sample. According to another embodiment, the speech signal or sample is transmitted to the articulatory feature extraction unit 415, so that the articulatory feature of the speaker may be extracted from the speech signal or sample. The sequential prosody feature and/or the articulatory feature of the speaker extracted as described above may be transmitted to the encoder 435 and/or the decoder 440 through the data learning unit 450 to be used to train the artificial neural network text-to-speech synthesis model. Alternatively, the sequential prosody feature and/or the articulatory feature of the speaker extracted as described above may be transmitted to the encoder 435 and/or the decoder 440 through the data recognition unit 455 to be used to generate a synthesized speech from the artificial neural network text-to-speech synthesis model.

In an embodiment, the communication unit 405 may receive a sequential prosody feature from an external device. For example, the text-to-speech synthesis system 400 may receive the sequential prosody feature extracted through the sequential prosody feature extractor 230 of FIG. 2 through the communication unit 405. In another embodiment, the communication unit 405 may receive the articulatory feature of the speaker from an external device. For example, the communication unit 405 may transmit and receive the articulatory feature 330 of the speaker from the speaker articulatory feature extractor 310 of FIG. 3. The sequential prosody feature and/or the articulatory feature of the speaker received as described above may be provided to at least one of the normalizer 420, the speech database 425, the attention module 430, the encoder 435, the decoder 440, the data learning unit 450 or the data recognition unit 455.

In an embodiment, the communication unit 405 may receive, as a sequential prosody feature, the prosody information on an input text from an external device. In this example, the prosody information may include attribute values input with a tag provided in a speech synthesis markup language for respective parts (e.g., phoneme, character, syllable, word, etc.) of the input text.

According to an embodiment, the communication unit 405 may transmit information related to the generated output speech, that is, may transmit output speech data to an external device. In addition, the generated artificial neural network text-to-speech synthesis model may be transmitted to a user terminal or another text-to-speech synthesis system through the communication unit 405.

FIG. 4 shows that the text-to-speech synthesis system 400 receives the text, the speech signal or sample, the sequential prosody feature, the articulatory feature of the speaker, etc. through the communication unit 405, or that the output speech data and the artificial neural network text-to-speech synthesis model are output through the communication unit 405. However, the text-to-speech synthesis system 400 may further include an input/output device (I/O device; not shown). Accordingly, the text-to-speech synthesis system 400 may directly receive an input from a user, and output at least one of a text, a speech, and a video to the user.

The sequential prosody feature extraction unit 410 may be configured to receive a speech signal or sample through the communication unit 405 or an input/output device, and extract the sequential prosody feature from the received speech signal or sample. In an embodiment, the sequential prosody feature extraction unit 410 may correspond to the sequential prosody feature extractor 230 of FIGS. 2 and 3. For example, the sequential prosody feature extraction unit 410 may extract a sequential prosody feature from a received speech signal or sample using a speech processing method such as mel frequency cepstral (MFC). Alternatively, the sequential prosody feature may be extracted by inputting a trained prosody feature model (e.g., an artificial neural network) using a speech sample. For example, the sequential prosody feature may be represented by a plurality of embedding vectors corresponding to a certain unit over time. In this example, the certain unit may correspond to at least one unit of a frame, phoneme, character, syllable, word, phrase, etc. According to another embodiment, the sequential prosody feature extraction unit 410 may receive at least one of information about a video, music, or sheet music, and be configured to extract a sequential prosody feature from the received video, music, and/or sheet music. According to an embodiment, modification information on a plurality of embedding vectors representing a sequential prosody feature may be received through an I/O device (not shown), and a plurality of embedding vectors may be modified through the received information.

The extracted or modified sequential prosody feature may be provided to the data learning unit 450 and/or the data recognition unit 455 and provided to at least one of the encoder 435 and/or the decoder 440. According to an embodiment, the sequential prosody feature may be provided to the normalizer 420 and/or the attention module 430 before being provided to the data learning unit 450 and/or the data recognition unit 455. According to an embodiment, the sequential prosody feature extracted from the sequential prosody feature extraction unit 410 may be stored in a storage medium (e.g., the speech database 425) or an external storage device. Accordingly, when synthesizing speech for an input text, one or more of a plurality of sequential prosody features stored in advance in the storage medium may be selected or designated, and the selected or designated sequential prosody feature may be used for the speech synthesis.

The articulatory feature extraction unit 415 may be configured to receive a speech signal (e.g., a speech sample) of the speaker and extract the articulatory feature of the speaker from the received speech signal. In this example, the extracted articulatory feature may simulate the speaker, include any feature included in the speaker's speech, and may be represented by a plurality of embedding vectors, for example. In extracting the articulatory feature of the speaker, any known suitable feature extraction method capable of extracting the articulatory features from the speech signal of the speaker may be used. For example, the articulatory feature extraction unit 415 may extract the articulatory feature of the speaker from the speech sample using an artificial neural network or a machine learning model. In an embodiment, the speaker-articulatory feature extraction unit 415 may correspond to the speaker articulatory feature extractor 310 of FIG. 3. The articulatory feature of the speaker extracted as described above may be provided to at least one of the data learning unit 450, the data recognition unit 455, the encoder 435, or the decoder 440.

According to an embodiment, the articulatory feature of the speaker extracted from the articulatory feature extraction unit 415 may be stored in the speech database 425 or an external storage device. Accordingly, in the speech synthesis for an input text, one or more of the articulatory features of a plurality of speakers stored in advance in the storage medium may be selected or designated, and the selected or designated articulatory feature of the speaker may be used for the speech synthesis.

According to an embodiment, the articulatory feature of the speaker may include the sequential prosody feature of the speaker. To this end, for example, the articulatory feature extraction unit 415 may be configured to extract the sequential prosody feature of the speaker from the speech sample. As another example, the articulatory feature extraction unit 415 may provide a speech sample to the sequential prosody feature extraction unit 410 and receive the sequential prosody feature of the speaker extracted from the speech sample. The sequential prosody feature of the speaker extracted as described above may be provided to the normalizer 420. FIG. 4 shows that the sequential prosody feature extraction unit 410 and the articulatory feature extraction unit 415 are configured as separate units, but the present disclosure is not limited thereto, and they may be configured as one unit.

The normalizer 420 may receive the sequential prosody feature received from the sequential prosody feature extraction unit 410 and the sequential prosody feature (a plurality of embedding vectors) of the speaker received from the articulatory feature extraction unit 415 as the articulatory feature of the speaker. For the sake of explanation, hereinafter, the sequential prosody feature received from the sequential prosody feature extraction unit 410 may be referred to as a first sequential prosody feature, and the sequential prosody feature of the speaker received from the articulatory feature extraction unit 415 may be referred to as a second sequential prosody feature.

The normalizer 420 may be configured to normalize the first sequential prosody feature (e.g., a plurality of embedding vectors) based on the second sequential prosody feature (e.g., a plurality of embedding vectors). In this example, the first sequential prosody feature may be a feature extracted from a speaker different from the speaker associated with the second sequential prosody feature. According to an embodiment, the normalizer 420 may be configured to calculate an average value of a plurality of embedding vectors corresponding to the second sequential prosody feature at each time-step. In addition, the normalizer 420 may normalize the plurality of embedding vectors representing the first sequential prosody feature by subtracting the average value of the embedding vectors calculated at each time-step from the plurality of embedding vectors representing the first sequential prosody feature. The plurality of embedding vectors normalized as described above may be provided to at least one of the speech database 425, the attention module 430, the encoder 435, the decoder 440, the data learning unit 450, or the data recognition unit 455. Since the plurality of embedding vectors corresponding to the first sequential prosody feature is normalized by using the average value of the plurality of embedding vectors corresponding to the second sequential prosody feature, when the artificial neural network text-to-speech synthesis model is used to simulate the speaker associated with the second sequential prosody feature and a synthesized speech corresponding to any text is generated to reflect a first sequential prosody feature extracted from another speaker, the first sequential prosody feature may be more naturally applied to the speeches of different speakers.

The speech database 425 may store a learning text and speeches corresponding to a plurality of learning texts, and these learning texts and the speeches corresponding thereto may be accessed by the data learning unit 450. The learning text may be written in at least one language, and may include at least one of a word, a phrase, and a sentence that can be understood by human. In addition, the speech stored in the speech database 425 may include speech data obtained by reading the learning text by a plurality of speakers. The learning text and speech data may be stored in the speech database 425 in advance or may be received from the communication unit 405. The data learning unit 450 may generate or learn an artificial neural network text-to-speech synthesis model based on the learning text and the speech stored in the speech database 425. For example, the artificial neural network text-synthesis model may include the encoder 435 and the decoder 440. As another example, the artificial neural network text-synthesis model may include the encoder 435, the decoder 440, and the post-processing processor 445.

According to an embodiment, the speech database 425 may be configured to store one or more sequential prosody features. For example, the one or more sequential prosody features may include a sequential prosody feature normalized by the normalizer 420. In another embodiment, it may be configured to store articulatory features of one or more speakers extracted from the articulatory feature extraction unit 415. The stored sequential prosody features may be provided to at least one of the encoder 435 or the decoder 440 when a speech is synthesized by the data learning unit 450 and/or the data recognition unit 455. In addition, the stored articulatory feature of the speaker may be provided to at least one of the encoder 435 or the decoder 440 when a speech is synthesized by the data learning unit 450 and/or the data recognition unit 455.

The attention module 430 may receive the sequential prosody feature or the normalized sequential prosody feature from the sequential prosody feature extraction unit 410 or the normalizer 420. According to an embodiment, the attention module 430 may be configured to receive a plurality of embedding vectors representing the sequential prosody feature, and generate a plurality of converted embedding vectors corresponding to respective parts of the input text provided to the encoder 435. For example, the attention module 430 may be configured to determine which part of the plurality of embedding vectors over time corresponds to which part of the input text in the current time-step. The plurality of converted embedding vectors generated by the attention module 430 may be provided to the encoder 435 for speech synthesis.

The encoder 435 may receive the input text and may be configured to convert and generate the input text into a character embedding. For example, the encoder 435 may be configured as a part of an artificial neural network text-to-speech synthesis model. The character embedding may be input to a first artificial neural network text-to-speech synthesis model (for example, pre-net, CBHG module, DNN, CNN+DNN, etc.) corresponding to the encoder 435 to generate the hidden states of the encoder 435. The first artificial neural network text-to-speech synthesis model may be included in the artificial neural network text-to-speech synthesis model. According to an embodiment, the encoder 435 may further receive the sequential prosody feature from the sequential prosody feature extraction unit 410, the normalizer 420, or the attention module 430. The character embedding and the sequential prosody feature may be input to the first artificial neural network text-to-speech synthesis model to generate hidden states of the encoder 435. In another embodiment, the encoder 435 may further receive the articulatory feature of the speaker from the articulatory feature extraction unit 415. The articulatory feature of the speaker may be input to the first artificial neural network text-to-speech synthesis model along with the character embedding and the sequential prosody feature to generate hidden states of the encoder 435. The hidden states of the encoder 435 generated as described above may be provided to the decoder 440.

The decoder 440 may be configured as a part of the artificial neural network text-to-speech synthesis model. In an embodiment, the decoder 440 may be configured to receive the sequential prosody feature. The decoder 440 may receive the sequential prosody feature from at least one of the sequential prosody feature extraction unit 410 or the normalizer 420. The decoder 440 may receive the hidden states corresponding to the input text from the encoder 435. In addition, the decoder 440 may include an attention module configured to determine from which part of the input text a speech is to be generated in the current time-step. Accordingly, the sequential prosody feature and/or the hidden states corresponding to the input text may be input to a second artificial neural network text-to-speech synthesis model (e.g., attention module, decoder RNN, attention RNN, Pre-net, DNN, etc.) corresponding to the decoder 440 to generate output speech data for the input text. The second artificial neural network text-to-speech synthesis model may be included in the artificial neural network text-to-speech synthesis model.

In another embodiment, the decoder 440 may be configured to further receive the articulatory feature of the speaker from the articulatory feature extraction unit 415. The sequential prosody feature, the hidden states corresponding to the input text, and/or the articulatory feature of the speaker may be input to the second artificial neural network text-to-speech synthesis model corresponding to the decoder 440 to generate output speech data for the input text. The output speech data may include output speech data for the input text, which simulates a speaker's speech and reflects the sequential prosody feature.

The output speech data generated as described above may be represented as a mel spectrogram. However, the present disclosure is not limited thereto, and the output speech data may be represented as a linear spectrogram. The output speech data may be output to at least one of a speaker device, a post-processing processor 445, or a communication unit 405.

According to an embodiment, the post-processing processor 445 may be configured to convert the output speech data generated by the decoder 440 into a speech available for output from the speaker device. For example, the converted speech available for output may be represented by a waveform. The post-processing processor 445 may be configured to operate only when the output speech data generated by the decoder 440 is not suitable for output from the speaker device. That is, when the output speech data generated by the decoder 440 is suitable for output from the speaker device, the output speech data may be directly output to the speaker device without going through the post-processing processor 445. Accordingly, FIG. 4 shows that the post-processing processor 445 is included in the text-to-speech synthesis system 400, but the post-processing processor 445 may not be included in the text-to-speech synthesis system 400.

According to an embodiment, the post-processing processor 445 may be configured to convert the output speech data represented by the mel spectrogram generated by the decoder 440 into a time domain waveform. In addition, the post-processing processor 445 may amplify the size of the output speech data when the size of the signal of the output speech data does not reach a predetermined reference size. The post-processing processor 445 may output the converted output speech data to at least one of the speaker device or the communication unit 405.

Figure 10:
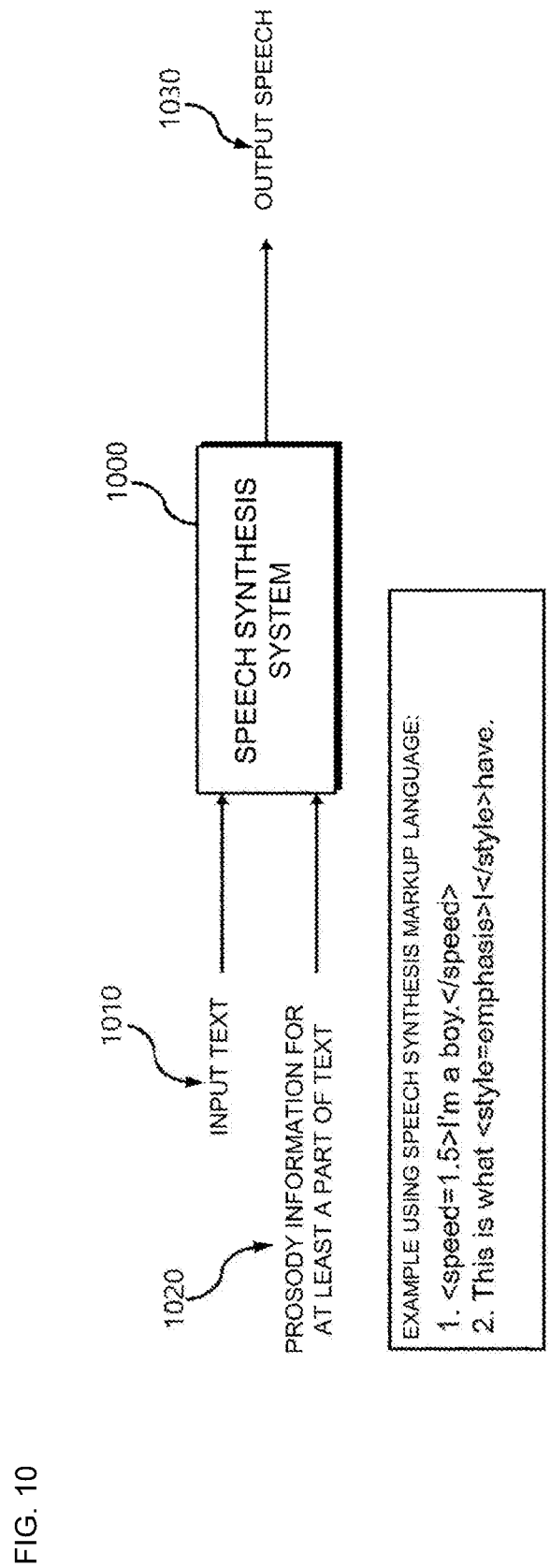
FIG. 10 is a schematic diagram of a text-to-speech synthesis system that outputs a synthesized speech by applying, to an input text, a tag provided in a markup language according to an embodiment of the present disclosure.

The data learning unit 450 may correspond to a data learning unit 1010 of FIG. 10. The data learning unit 450 may receive data representing a plurality of learning texts and learning speeches corresponding thereto through the speech database 425 or the communication unit 405. The data representing the learning text may include information about at least one character. For example, the data representing the learning text may include a phoneme sequence corresponding to the learning text using a graph-to-phoneme (G2P) algorithm. The data representing the learning speeches may be recording data of a speech recorded as a person reads the learning text, a sound feature extracted from such recording data, or a spectrogram. In an embodiment, the data representing a learning speech may include a sequential prosody feature of the learning speech. In another embodiment, the data representing the learning speech may further include an articulatory feature of the speaker who uttered the learning speech. The data learning unit 450 may perform machine learning based on a plurality of learning texts and learning data pairs corresponding to the learning speeches corresponding to the learning texts, so as to generate an artificial neural network text-to-speech synthesis model. In this learning, the learning texts may be provided to the first artificial neural network text-to-speech synthesis model corresponding to the encoder of the artificial neural network text-to-speech synthesis model, and the sequential prosody feature may be input to the first artificial neural network text-to-speech synthesis model and/or the second artificial neural network text-to-speech synthesis model corresponding to the decoder.

According to an embodiment, the data recognition unit 455 may be configured to receive the input text and receive the sequential prosody feature. The input text and the sequential prosody feature may be input to the artificial neural network text-to-speech synthesis model to generate output speech data corresponding to the input text reflecting the received prosody feature. In this example, the input text may be provided to the first artificial neural network text-to-speech synthesis model, and the sequential prosody feature may be input to the first artificial neural network text-to-speech synthesis model and/or the second artificial neural network text-to-speech synthesis model. As a result, the output speech data for the input text reflecting the sequential prosody feature may be generated from the artificial neural network text-to-speech synthesis model. According to another embodiment, the data recognition unit 455 may be configured to further receive the articulatory feature of the speaker. In the similar manner, the sequential prosody feature, the received articulatory feature of the speaker may be provided to the second artificial neural network text-to-speech synthesis model. Under this operation, output speech data for the input text, which simulates the speaker's speech and reflects the sequential prosody feature, may be generated from the artificial neural network text-to-speech synthesis model.

Figure 5:
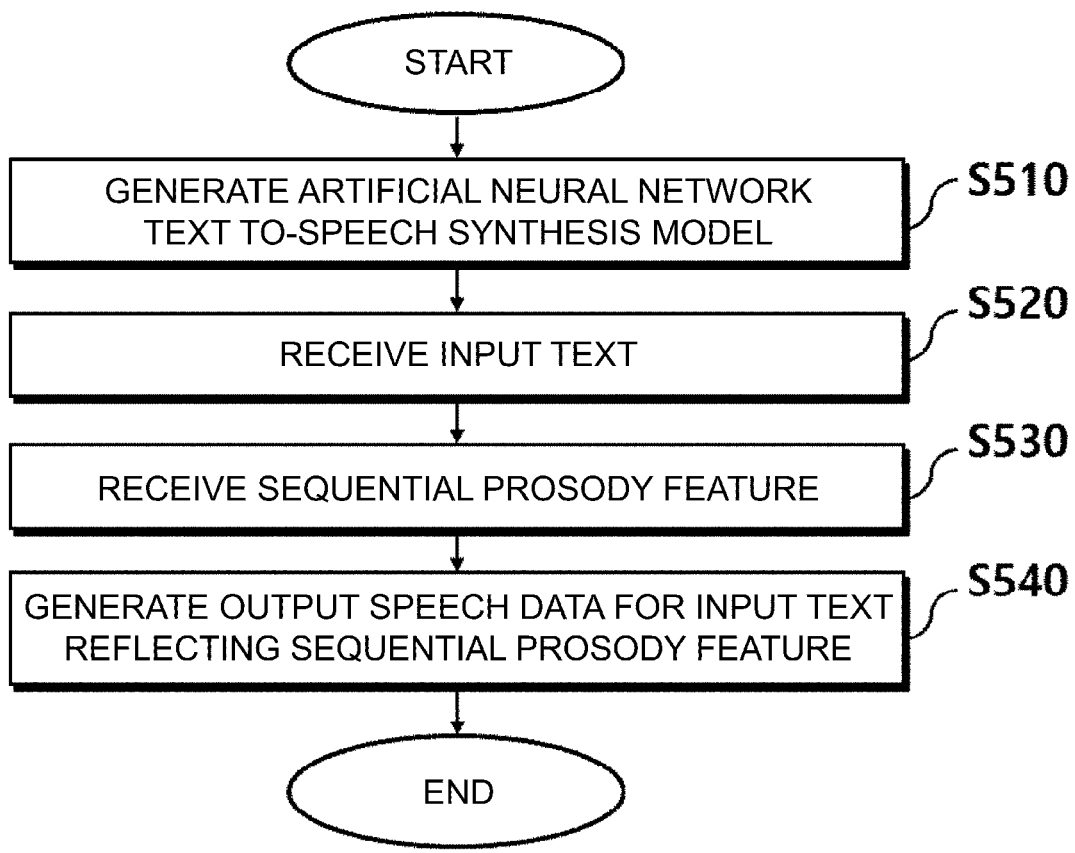
FIG. 5 is a flowchart showing a text-to-speech synthesis method using machine learning based on a sequential prosody feature according to an embodiment of the present disclosure.

FIG. 5 is a flowchart showing a text-to-speech synthesis method using machine learning based on a sequential prosody feature according to an embodiment of the present disclosure. First, at S510, the text-speech synthesis system 400 may perform a step of generating an artificial neural network text-to-speech synthesis model generated by performing machine learning based on a plurality of learning texts and speech data corresponding to the plurality of learning texts. In this example, the artificial neural network text-to-speech synthesis model may be a single artificial neural network text-to-speech synthesis model.

At S520, the text-to-speech synthesis system 400 may perform a step of receiving an input text. At S530, the text-to-speech synthesis system 400 may perform a step of receiving a sequential prosody feature. At S540, the text-to-speech synthesis system 400 may input the input text and the sequential prosody feature into a pre-trained text-to-speech synthesis model, so as to generate output speech data for the input text in which the sequential prosody feature is reflected.

Figure 6:
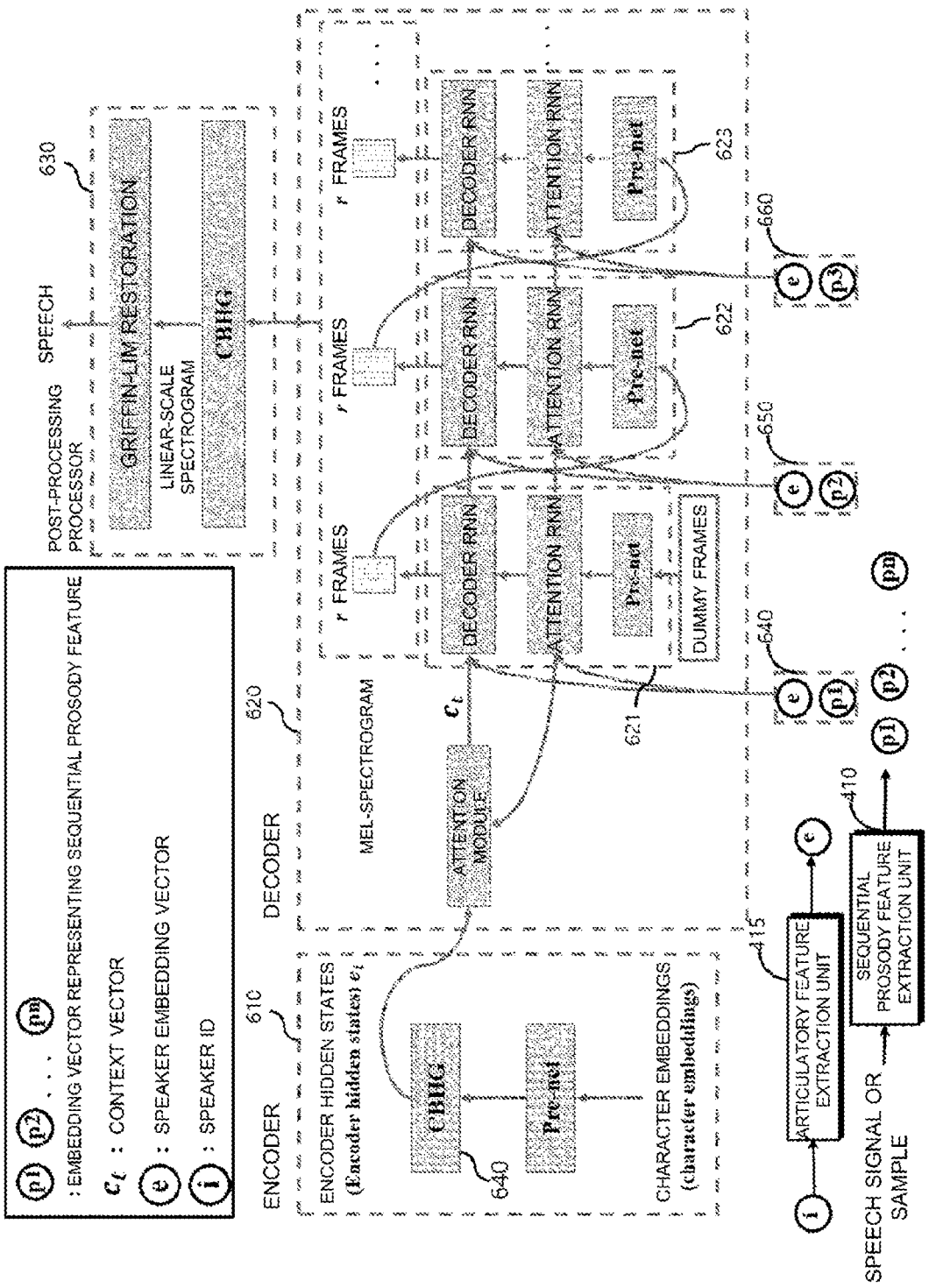
FIG. 6 is an exemplary diagram showing a configuration of a text-to-speech synthesis system based on an artificial neural network according to an embodiment of the present disclosure.

FIG. 6 is an exemplary diagram showing a configuration of a text-to-speech synthesis system based on an artificial neural network according to an embodiment of the present disclosure. In an embodiment, each of an encoder 610, a decoder 620 and a post-processing processor 630 may correspond to each of the encoder 435, the decoder 440, and the post-processing processor 445 of FIG. 4.

According to an embodiment, the encoder 610 may receive a character embedding for an input text, as shown in FIG. 6. According to another embodiment, the input text may include at least one of word, phrase, or sentence used in one or more languages. For example, a text such as a sentence such as "HELLO" may be input. When the input text is received, the encoder 610 may divide the received input text in units of a syllable, a character, or a phoneme. According to another embodiment, the encoder 610 may receive the input text divided in units of a syllable, a character, or a phoneme. Then, the encoder 610 may convert and generate the input text into a character embedding.

The encoder 610 may be configured to generate text as pronunciation information. In an embodiment, the encoder 610 may pass the generated character embedding through a pre-net including a fully-connected layer. In addition, the encoder 610 may provide the output from the pre-net to the CBHG module to output the encoder hidden states ei as shown in FIG. 6. For example, the CBHG module may include a 1D convolution bank, a max pooling, a highway network, and a bidirectional gated recurrent unit (GRU).

In another embodiment, when the encoder 610 receives an input text or a divided input text, the encoder 610 may be configured to generate at least one embedding layer. According to an embodiment, at least one embedding layer of the encoder 610 may generate a character embedding based on an input text divided in units of a syllable, a character, or a phoneme. For example, the encoder 610 may use a machine learning model (e.g., a probability model, an artificial neural network, or the like) that has already been learned to acquire the character embedding based on the divided input text. Furthermore, the encoder 610 may update the machine learning model while performing machine learning. When the machine learning model is updated, the character embedding for the divided input text may also be changed. The encoder 610 may pass the character embedding through a deep neural network (DNN) module formed of a fully-connected layer. The DNN may include a general feedforward layer or a linear layer. The encoder 610 may provide the output of the DNN to a module including at least one of a convolutional neural network (CNN) or a recurrent neural network (RNN), and generate hidden states of the encoder 610. While the CNN may capture a local feature according to a size of the convolution kernel, the RNN may capture long term dependency. The hidden states of the encoder 610, that is, pronunciation information on the input text, may be provided to the decoder 620 including the attention module, and the decoder 620 may be configured to generate such pronunciation information into a speech. The decoder 620 may receive the hidden states ei of the encoder from the encoder 610. In an embodiment, as shown in FIG. 6, the decoder 620 may include an attention module, a pre-net formed of a fully-connected layer and a gated recurrent unit (GRU), and may include an attention recurrent neural network (RNN) and a decoder RNN including a residual GRU. In this example, the attention RNN may output information to be used in the attention module. In addition, the decoder RNN may receive position information of the input text from the attention module. That is, the position information may include information regarding which position in the input text is being converted into a speech by the decoder 620. The decoder RNN may receive information from the attention RNN. The information received from the attention RNN may include information regarding which speeches the decoder 620 has generated up to the previous time-step. The decoder RNN may generate the next output speech following the speeches that have been generated so far. For example, the output speech may have a mel spectrogram form, and the output speech may include r frames.

In another embodiment, the pre-net included in the decoder 620 may be replaced with a DNN including a fully-connected layer. In this example, the DNN may include at least one of a general feedforward layer or a linear layer.

In an embodiment, the decoder 620 may be configured to receive the sequential prosody feature.

For example, as shown in FIG. 6, the sequential prosody feature extraction unit 410 may extract a plurality of embedding vectors p1, p2, . . . , pn (where n is proportional to the length of the speech sample) representing the sequential prosody feature from the speech signal or sample. Each of the plurality of embedding vectors may include a prosody feature or information for each unit time. The method in which the sequential prosody feature extraction unit 410 inputs a plurality of embedding vectors p1, p2, . . . , pn from a speech signal or sample to the decoder will be described in detail below with reference to FIG. 7.

In an embodiment, the decoder 620 may be configured to further receive the articulatory feature of the speaker. For example, as shown in FIG. 6, for the articulatory feature of the speaker, a speaker ID may be input to the speech feature extraction unit 415 such that a speaker embedding vector e corresponding to the articulatory feature of the speaker may be generated as the articulatory feature of the speaker. As another example, the articulatory feature of the speaker may be generated by extracting the embedding vector of the speaker from a speech signal or sample rather than the speaker ID.

Also, the attention module of the decoder 620 may receive information from the attention RNN. The information received from the attention RNN may include information regarding which speeches the decoder 620 has generated up to the previous time-step. In addition, the attention module of the decoder 620 may output a context vector based on the information received from the attention RNN and the information of the encoder. The information of the encoder 610 may include information regarding an input text from which speech is to be generated. The context vector may include information for determining a part of the input text for use in generating a speech in the current time-step. For example, the attention module of the decoder 620 may output information for generating a speech based on the front portion of the input text at the beginning of the speech generation and generating a speech based on the rear portion of the input text as the speech is being generated.

The decoder 620 may configure the structure of the artificial neural network such that decoding is performed differently depending on each speaker and each part of the input text by inputting the sequential prosody feature, or more specifically, by inputting each of the embedding vectors p1, p2, . . . , pn according to time units and the speaker embedding vector e for each time-step of the attention RNN and the decoder RNN. FIG. 6 shows that a plurality of embedding vectors p1, p2, . . . , pn are extracted from the sequential prosody feature extraction unit 410, but the present disclosure is not limited thereto, and the decoder 620 may receive a plurality of embedding vectors corresponding to the normalized sequential prosody feature from the normalizer 420, and a plurality of embedding vectors corresponding to the normalized sequential prosody feature may be input for each time-step of the attention RNN and the decoder RNN together with the embedding vector e of the speaker.

The dummy frames are frames to be input to the decoder 620 when there is no previous time-step. The RNN may perform machine learning autoregressively. That is, the r frames output in the immediately preceding time-step 622 may be an input for the current time-step 623. At the first time-step 621, since there cannot be an immediately preceding time-step, the decoder 620 may input dummy frames to the initial time-step machine learning network.

For the purpose of text-to-speech synthesis, the operations of the DNN, the attention RNN, and the decoder RNN may be repeatedly performed. For example, the r frames acquired at the initial time-step 621 may be inputs for a subsequent time-step 622. In addition, the r frames output at the time-step 622 may be inputs for a subsequent time-step 623.

Through the process described above, not only the input text may be speech synthesized for each speaker, but also the prosody features of respective parts may be reflected in the input text in chronological order. That is, it is possible to control the prosody feature of the synthesized speech corresponding to the input text at a specific point in time. Accordingly, the text-to-speech synthesis system may finely control the prosody for the synthesized speech in order to more accurately convey people's intentions or emotions.

According to an embodiment, the decoder 620 may acquire a speech of a mel-spectrogram for the whole text by concatenating mel-spectrograms for the respective time-steps in chronological order. The speech of the mel spectrogram for the whole text may be output to the post-processing processor 630. For example, the post-processing processor 630 may correspond to the post-processing processor 445 of FIG. 4.

According to an embodiment, the CBHG of the post-processing processor 630 may be configured to convert the mel-scale spectrogram of the decoder 620 into a linear-scale spectrogram, as shown in FIG. 6. For example, the output signal of the CBHG of the post-processing processor 630 may include a magnitude spectrogram. The phase of the output signal of the CBHG of the post-processing processor 630 may be restored through a Griffin-Lim algorithm and subjected to Inverse Short-Time Fourier Transform. The post-processing processor 630 may output a speech signal in a time domain.

According to another embodiment, when the encoder 610 is configured to include a CNN or RNN, the post-processing processor 630 may be configured to include a CNN or RNN, and such a CNN or RNN may perform similar operations to those of the CNN or RNN of the encoder 610. That is, the CNN or RNN of the post-processing processor 630 may capture a regional feature and long term dependency. For example, the post-processing processor 630 may be a vocoder. Accordingly, the CNN or RNN of the post-processing processor 630 may output a linear-scale spectrogram. For example, a linear-scale spectrogram may include a magnitude spectrogram. The post-processing processor 630 may predict the phase of the spectrogram through the Griffin-Lim algorithm. The post-processing processor 630 may output a speech signal in a time domain using an Inverse Short-Time Fourier Transform.

According to still another embodiment, the post-processing processor 630 may generate a speech signal from the mel spectrogram based on a machine learning model. The machine learning model may include a machine learning model about the correlation between the mel spectrogram and the speech signal. For example, an artificial neural network model such as WaveNet or WaveGlow may be used.

The artificial neural network-based text-to-speech synthesis system may be trained using a large database existing as a pair of a learning text and a speech signal. According to an embodiment, a speech synthesis apparatus may receive a text and compare an output speech signal to a target speech signal to define a loss function. The speech synthesis apparatus may learn the loss function through an error back-propagation algorithm and thus may obtain an artificial neural network that outputs a finally desired speech when any text is input.

In such an artificial neural network-based speech synthesis apparatus, text, an articulatory feature of a speaker, and a sequential prosody feature may be input to an artificial neural network text-to-speech synthesis model to output a speech signal. A text-to-speech synthesis system may learn by comparing an output speech signal and a target speech signal, so as to generate, when receiving a text, an articulatory feature of the speaker and a sequential prosody feature, output speech data that corresponds to the speaker's speech reading the text in which the sequential prosody feature is reflected.

Figure 7:
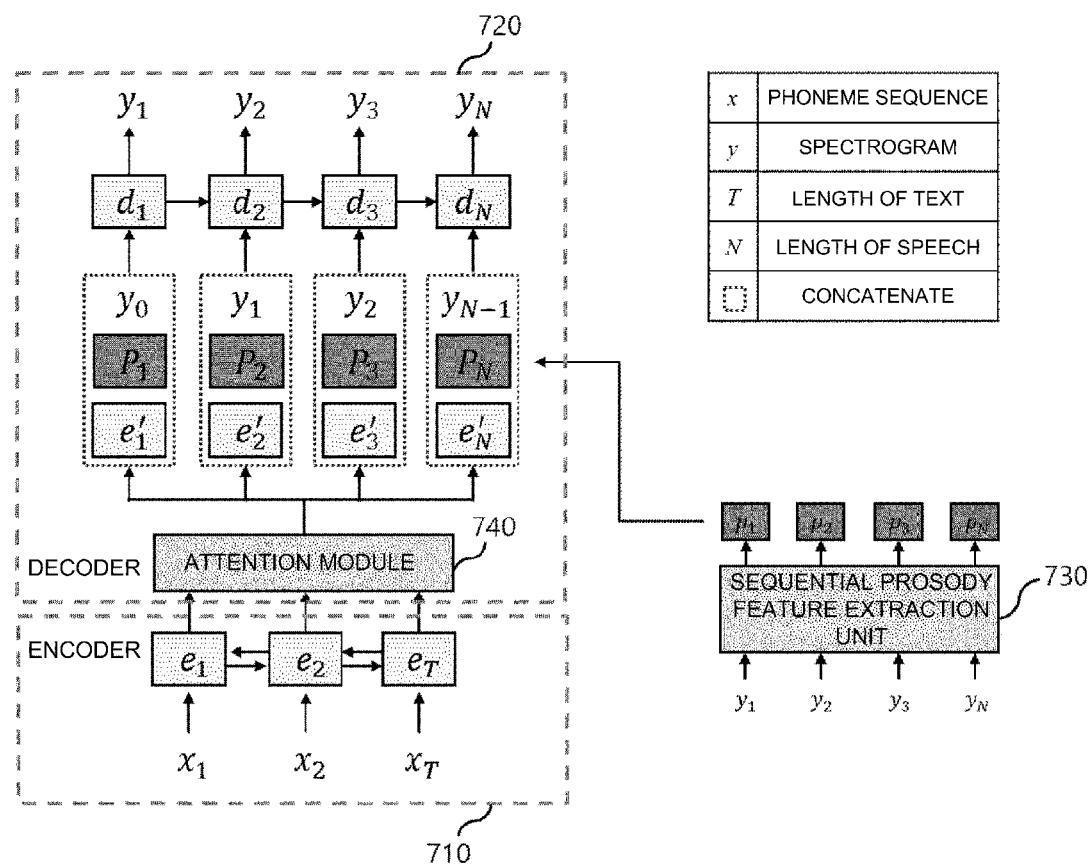
FIG. 7 is an exemplary view showing a process in a text-to-speech synthesis system based on an artificial neural network according to an embodiment of the present disclosure, of inputting a sequential prosody feature to a decoder of the text-to-speech synthesis system and generating a synthesized speech.

FIG. 7 is an exemplary view showing a process in a text-to-speech synthesis system based on an artificial neural network according to an embodiment of the present disclosure, of inputting a sequential prosody feature to a decoder 720 of the text-to-speech synthesis system and generating a synthesized speech. In this example, each of an encoder 710, the decoder 720, a sequential prosody feature extraction unit 730 and an attention module 740 may correspond to each of the encoder 435, the decoder 440, the sequential prosody feature extraction unit 410, and the attention module 430 of FIG. 4. In addition, the encoder 710 and the decoder 720 may correspond to the encoder 610 and decoder 620 of FIG. 6, respectively. FIG. 7 is illustrated based on the assumption that the length N of the speech is 4 and the length T of the text is 3, but the present disclosure is not limited thereto, and the length N of the speech and the length T of the text may be any positive numbers different from each other.

According to an embodiment, as shown in FIG. 7, the sequential prosody feature extraction unit 730 may be configured to receive spectrograms $y_1, y_2, y_3, \ldots, y_n$, and extract a plurality of embedding vectors $P_1, P_2, P_3, \ldots, P_n$ representing the sequential prosody feature. The plurality of embedding vectors extracted as described above may be provided to the decoder 720. For example, the extracted plurality of embedding vectors $P_1, P_2, P_3, \ldots, P_n$ may be provided to N number of decoder RNNs and attention RNNs of the decoder 720. In addition, the hidden states $e_1, e_2, \ldots, e_T$ provided from the encoder 710 may be provided to the attention module 740, and the attention module 740 may generate converted hidden states $e'_1, e'_2, e'_3, \ldots, e'_N$ such that the hidden states $e_1, e_2, \ldots, e_T$ correspond to the lengths of the spectrogram $P_1, P_2, P_3, \ldots, P_n$. The generated converted hidden states $e'_1, e'_2, e'_3, \ldots, e'_N$ may be concatenated with the extracted plurality of embedding vectors $P_1, P_2, P_3, \ldots, P_n$ and input and processed in each of the N number of decoder RNNs and attention RNNs. Since the process in the decoder 720 is a process that overlaps with the process described above with reference to FIG. 6, detailed description thereof will be omitted. Through this process, the artificial neural network text-to-speech synthesis model included in the encoder 710 and the decoder 720 may be trained so that the sequential prosody feature can be more naturally reflected.

FIG. 7 illustrates a process in which the spectrograms $y_1, y_2, y_3, \ldots, y_n$ representing a specific speech are provided to the sequential prosody feature extraction unit 730, and the same spectrograms are output through the decoder 620, but the present disclosure is not limited thereto, and a speech having a different length from the speech output through the decoder 720 may be input to the sequential prosody feature extraction unit 730. In this case, an additional attention module (not shown) may receive a plurality of embedding vectors extracted from the sequential prosody feature extraction unit and convert the lengths of the received plurality of embedding vectors so as to correspond to the lengths of the speeches output through the decoder 720. Then, the converted plurality of embedding vectors may be provided to the decoder 720.

Figure 8:
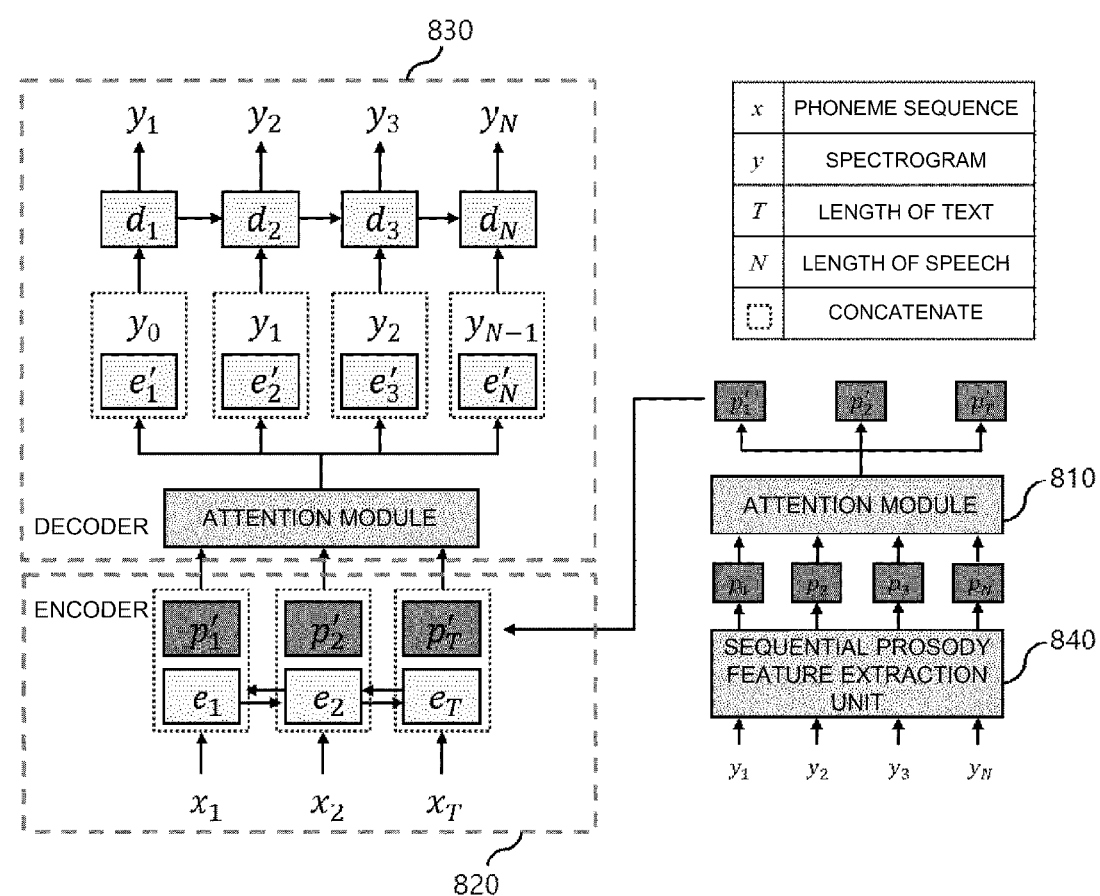
FIG. 8 is an exemplary view showing a process in a text-to-speech synthesis system based on an artificial neural network according to an embodiment of the present disclosure, of inputting a sequential prosody feature to an encoder of a text-to-speech synthesis system and generating a synthesized speech.

FIG. 8 is an exemplary view showing a process in a text-to-speech synthesis system based on an artificial neural network according to an embodiment of the present disclosure, of inputting a sequential prosody feature to an encoder 820 of the text-to-speech synthesis system and generating a synthesized speech. In this example, each of an attention module 810, an encoder 820, a decoder 830, and a sequential prosody feature extraction unit 840 may correspond to each of the attention module 430, the encoder 435, the decoder 440 and the sequential prosody feature extraction unit 410 of FIG. 4. In addition, the encoder 820 and the decoder 830 may correspond to the encoder 610 and decoder 620 of FIG. 6, respectively. FIG. 8 is illustrated based on the assumption that the length N of the speech is 4 and the length T of the text is 3, but the present disclosure is not limited thereto, and the length N of the speech and the length T of the text may be any positive numbers different from each other.

According to an embodiment, as shown in FIG. 8, the sequential prosody feature extraction unit 840 may be configured to receive the spectrograms $y_1, y_2, y_3, \ldots, y_n$, and extract a plurality of embedding vectors $P_1, P_2, P_3, \ldots, P_n$ representing the sequential prosody feature. The plurality of embedding vectors $P_1, P_2, P_3, \ldots, P_n$ extracted as described above may be provided to the attention module 810. The attention module 810 is configured to generate a plurality of converted embedding vectors such that the plurality of input embedding vectors $P_1, P_2, P_3, \ldots, P_n$ correspond to the length T of the phoneme sequence corresponding to the encoder 820. According to another embodiment, the sequential prosody feature extraction unit 840 may generate a plurality of converted embedding vectors to correspond to a word rather than a phoneme. For example, when the i-th phoneme and the j-th phoneme is included in the same word v, it may have a value of Pi'=Pj', and the attention module 810 may be configured to generate a plurality of converted embedding vectors $P'_{v_1}, P'_{v_2}, \ldots, P'_{v_M}$ corresponding to the word. The length $v_M$ of the word may be any positive number different from N and T. As an example of obtaining $P'_{v_k}$, an average of the converted embedding vectors of the phonemes included in the same word may be used, but the present disclosure is not limited thereto, and an additional attention module or the like may be used.

As shown in FIG. 8, each of the plurality of converted embedding vectors $P_1', P_2', \ldots, P_T'$ generated as described above may be concatenated to correspond to each of the hidden states $e_1, e_2, \ldots, e_T$ corresponding to the phoneme sequence of the input text. The hidden states $e_1, e_2, \ldots, e_T$ and the plurality of converted embedding vectors $P_1', P_2', \ldots, P_T'$ concatenated as described above may be provided to the decoder 830. Alternatively, the decoder 830 may generate phoneme sequences $y_1, y_2, y_3, \ldots, y_n$ from the hidden states $e_1, e_2, e_T$ and the converted embedding vectors $P_1', P_2', \ldots, P_T'$ received as described above, by using the attention module, the pre-net, and the N number of decoder RNNs and attention RNNs of the decoder 830. Alternatively, when a plurality of converted embedding vectors $P'_{v_1}, P'_{v_2}, \ldots, P'_{v_M}$ corresponding to a word are generated, each of the plurality of converted embedding vectors $P'_{v_1}, P'_{v_2}, \ldots, P'_{v_M}$ may be concatenated to correspond to each of the hidden states corresponding to the word sequence of the input text. Since the process in the decoder is a process that overlaps with the process described above in FIG. 6, detailed description thereof will be omitted. Through this process, the artificial neural network text-to-speech synthesis model included in the encoder 820 and the decoder 830 may be trained so that the sequential prosody feature can be more naturally reflected.

Figure 9:
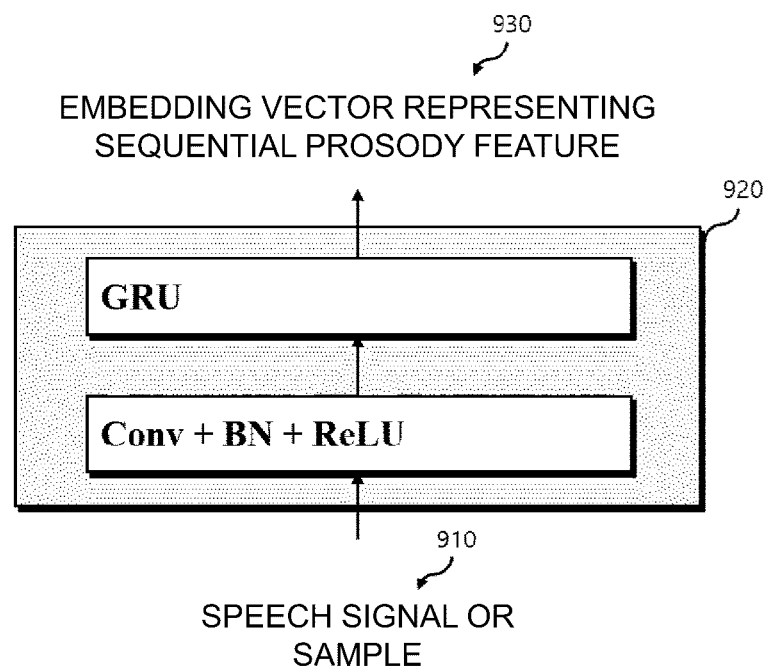
FIG. 9 is an exemplary view showing a network of a sequential prosody feature extraction unit configured to extract a plurality of embedding vectors representing the sequential prosody feature from a speech signal or sample according to an embodiment of the present disclosure.

FIG. 9 is an exemplary view showing a network of a sequential prosody feature extraction unit 920 configured to extract a plurality of embedding vectors 930 representing the sequential prosody feature from a speech signal or sample 910 according to an embodiment of the present disclosure. In an embodiment, the network of the sequential prosody feature extraction unit 920 may include a convolutional neural network (CNN), a batch-normalization (BN), a rectifier linear unit (ReLU) and a gated recurrent unit (GRU). When the CNN, the BN, and the ReLU receive a speech signal or sample and input the output value to the gated recurrent unit (GRU), a plurality of embedding vectors representing a sequential prosody feature may be output. For example, a speech signal or sample may be received in the form of a log-Mel-spectrogram.

In an embodiment, when the data recognition unit 455 infers speech synthesis, the speech signal or sample may not be necessarily the speech data corresponding to the input text, and any selected speech signal may be used. Alternatively, when the data learning unit 450 learns speech synthesis, the speech signal or sample may include the speech data corresponding to the input text.

In such a network, any spectrogram may be inserted into this network because there are no restrictions on the use of the spectrograms. In addition, through this, an embedding vector 930 representing a sequential prosody feature may be generated through immediate adaptation of the network. The spectrogram input as a speech signal or sample may have a variable length, and the lengths of a plurality of embedding vectors may vary with the length. FIG. 9 shows a network including the CNN, the BN, the ReLU, and the GRU, but a network including various layers may be formed to extract a sequential prosody feature.

FIG. 10 is a schematic diagram of a text-to-speech synthesis system 1000 that outputs a synthesized speech by applying, to an input text, attribute values input to a tag provided in a markup language according to an embodiment of the present disclosure. In an embodiment, the text-to-speech synthesis system 1000 may correspond to the text-to-speech synthesis system 400 of FIG. 4 and/or a text-to-speech synthesis system 1100 of FIG. 11.

In order to generate, adjust, or change the sequential prosody information, the text-to-speech synthesis system 1000 may receive prosody information on at least a part of a text through an interface device. In this example, the interface device may include any interface device directly connected to the text-to-speech synthesis system 1000 or connected through wired and/or wireless communication, and may include an interface of a user terminal, for example.

In addition, the prosody information on at least a part of the text may be received through any text editor or speech editor capable of entering and editing any text.

According to an embodiment, the text-to-speech synthesis system 1000 may receive attribute values corresponding to respective parts of the input text as the prosody information using a tag of any speech synthesis markup language provided in any text editor. For example, the tag provided by the speech synthesis markup language may include any tag to indicate attributes included in the sequential prosody feature. The prosody information corresponding to a text part between the opening and closing tags may be input. For example, as shown in FIG. 10, "1.<speed=1.5>I'm a boy.</speed>" may include the prosody information indicating the speed in the part of "I'm a boy" between the opening and closing tags. As another example, as shown in FIG. 10, "2. This is what <style=emphasis>I</style>have." may include the prosody information indicating emphasis on the character "I" between the opening and closing tags.

The text-to-speech synthesis system 1000 may generate the sequential prosody information based on the received prosody information on at least a part of the input text, or change the sequential prosody information corresponding to the input text, that is, change the prosody information corresponding to the input text, and generate a synthesized speech corresponding to the input text in which the generated or changed sequential prosody information is reflected. According to an embodiment, the text-to-speech synthesis system 1000 may apply the prosody information (e.g., attribute values) corresponding to the respective parts of the input text input to a reference embedding vector corresponding to reference sequential prosody information. In this example, the reference embedding vector may include a plurality of embedding vectors representing predetermined sequential prosody feature information. For example, the reference embedding vector includes a prosody feature vector over time, and each prosody feature information may be represented by a weighted sum of a plurality of sub-embedding vectors orthogonal to each other (for example, height, size, length, pause duration, style vector, etc.) The text-to-speech synthesis system 1000 may separate the intrinsic elements of the reference embedding vector. For example, the text-to-speech synthesis system 1000 may acquire a plurality of unit embedding vectors orthogonal to each other based on the reference embedding vector. According to an embodiment, a method for separating the elements inherent in the embedding vector may include various methods such as Independent Component Analysis (ICA), Independent Vector Analysis (IVA), sparse coding, Independent Factor Analysis (IFA), Independent Subspace Analysis (ISA), Nonnegative Matrix Factorization (NMF), etc. In addition, the text-to-speech synthesis system 1000 may perform regularization during learning of the text-to-speech synthesis system when learning the embedding vector for the sequential prosody feature so that elements inherent in the embedding vector may be separated. This normalization may be performed through the normalizer 420 of FIG. 4. When the text-to-speech synthesis system 1000 performs machine learning by performing normalization during learning, the reference embedding vector may be trained as a sparse vector. Accordingly, the text-to-speech synthesis system 900 may accurately separate the inherent elements using the principle component analysis (PCA) from the embedding vector trained as the sparse vector. According to this configuration, the text-to-speech synthesis system 1000 may modify the reference embedding vector based on the attribute values in a tag provided in the speech synthesis markup language. For example, the text-to-speech synthesis system 1000 may change weights for a plurality of unit embedding vectors based on the received attribute values in the tag.

In an embodiment, the text-to-speech synthesis system 1000 may be configured to modify the reference embedding vector based on the received attribute values in the tag provided in the speech synthesis markup language. For example, the text-to-speech synthesis system 1000 may resynthesize the embedding vectors corresponding to the sequential prosody feature by summing the values obtained by multiplying the weights changed according to the received attribute values by a plurality of unit embedding vectors. The text-to-speech synthesis system 1000 may output the embedding vector for the changed sequential prosody feature information. The text-to-speech synthesis system 1000 may input the modified embedding vector to the artificial neural network text-to-speech synthesis model, to convert the output speech data into speech data corresponding to the input text in which the information included in attribute values in a tag provided in the speech synthesis markup language is reflected.

Figure 11:
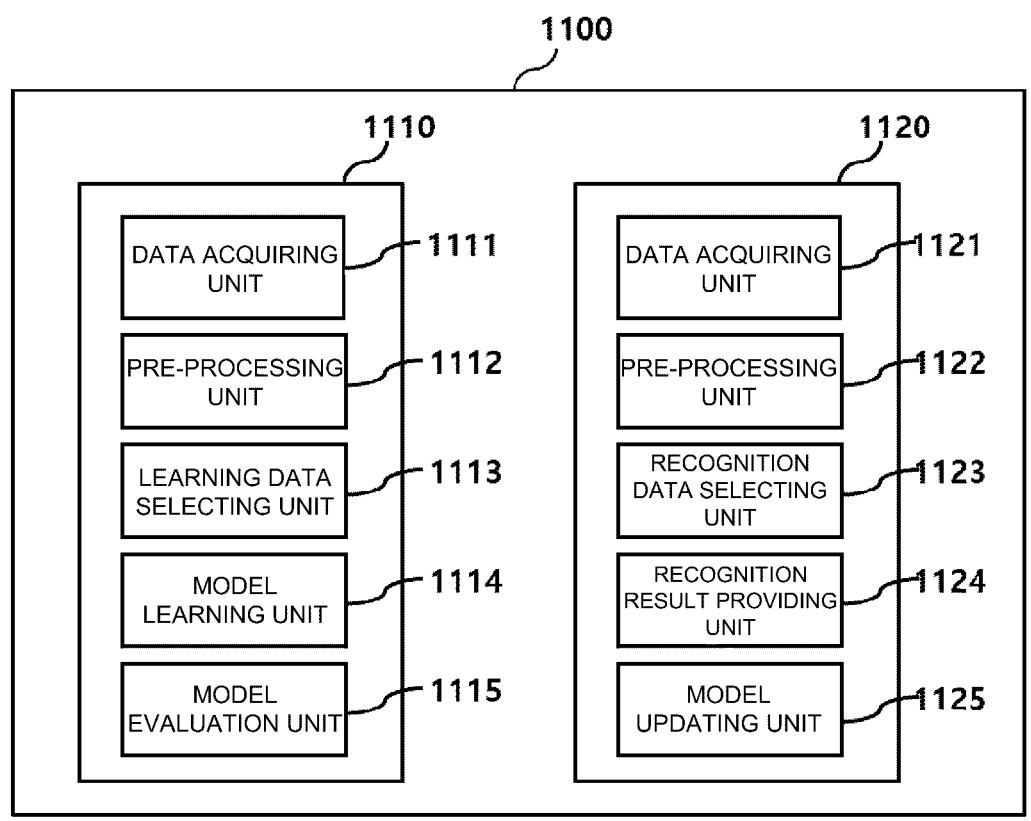
FIG. 11 is a block diagram of a text-to-speech synthesis system according to an embodiment of the present disclosure.

FIG. 11 is a block diagram showing a text-to-speech synthesis system 1100 according to an embodiment of the present disclosure.

Referring to FIG. 11, the text-to-speech synthesis system 1100 according to an embodiment may include a data learning unit 1110 and a data recognition unit 1120. Each of the data learning unit 1110 and the data recognition unit 1120 of the text-to-speech synthesis system of FIG. 11 may correspond to each of the data learning unit 450 and the data recognition unit 455 used by the text-to-speech synthesis system 400 of FIG. 4.

The data learning unit 1110 may acquire a machine learning model by inputting data. In addition, the data recognition unit 1120 may generate output speech by applying the data to the machine learning model. The text-to-speech synthesis system 1100 as described above may include a processor and a memory.

The data learning unit 1110 may learn a speech for a text. The data learning unit 1110 may learn a criterion on which speech is to be output according to the text. Also, the data learning unit 1110 may learn a criterion on which speech feature is to be used to output the speech. The speech feature may include at least one of a phoneme pronunciation and a user's tone, intonation, or accent. The data learning unit 1110 may learn a speech for a text by acquiring data to be used for the learning and by applying the acquired data to a data learning model to be described below.

The data recognition unit 1120 may output a speech for a text based on the text. The data recognition unit 1120 may output a speech from a predetermined text using the learned data learning model. The data recognition unit 1120 may acquire a predetermined text (data) according to a predetermined criterion by the learning. Also, the data recognition unit 1120 may output a speech based on the predetermined data by setting the acquired data as an input value and using the data learning model. Also, a result value that is output by the data learning model using the acquired data as an input value may be used to update the data learning model.

At least one of the data learning unit 1110 or the data recognition unit 1120 may be manufactured in the form of at least one hardware chip and mounted on an electronic apparatus. For example, at least one of the data learning unit 1110 or the data recognition unit 1120 may be manufactured in the form of an artificial intelligence (AI)-dedicated hardware chip or a portion of a conventional general-purpose processor (e.g., a CPU or an application processor) or a graphics processor (e.g., a GPU) and thus may be mounted on various electronic apparatuses that have been described above.

Also, the data learning unit 1110 and the data recognition unit 1120 may be mounted on separate electronic apparatuses. For example, one of the data learning unit 1110 and the data recognition unit 1120 may be included in an electronic apparatus, and the other may be included in a server. Also, the following operations may be performed between the data learning unit 1110 and the data recognition unit 1120 in a wired or wireless manner. Model information established by the data learning unit 1110 may be provided to the data recognition unit 1120, and data input to the data recognition unit 1120 may be provided to the data learning unit 1110 as additional learning data.

Meanwhile, at least one of the data learning unit 1110 or the data recognition unit 1120 may be implemented as a software module. When at least one of the data learning unit 1110 or the data recognition unit 1120 is implemented as a software module (or a program module including instructions), the software module may be stored in a memory or a non-transitory computer-readable medium. Also, in this case, at least one software module may be provided by an operating system (OS) or may be provided by a predetermined application. Unlike this, some of the at least one software module may be provided by an OS, and the others may be provided by a predetermined application.

The data learning unit 1110 according to an embodiment of the present disclosure may include a data acquiring unit 1111, a pre-processing unit 1112, a learning data selecting unit 1113, a model learning unit 1114, and a model evaluation unit 1115.

The data acquiring unit 1111 may acquire data necessary for machine learning. Since much data is needed for the learning, the data acquiring unit 1111 may receive a plurality of texts and speeches corresponding to the texts.

The pre-processing unit 1112 may pre-process the acquired data such that the acquired data can be used for machine learning in order to determine the user's mental state. The pre-processing unit 1112 may process the acquired data in a predetermined format such that the model learning unit 1114 to be described below can use the data. For example, the pre-processing unit 1112 may morphologically analyze a text and a speech to acquire a morpheme embedding.

The learning data selecting unit 1113 may select data necessary for learning from the pre-processed data. The selected data may be provided to the model learning unit 1114. The learning data selecting unit 1113 may select data necessary for learning from the pre-processed data according to a predetermined criterion. Also, the learning data selecting unit 1113 may select data according to the predetermined criterion through learning by the model learning unit 1114 to be described below.

The model learning unit 1114 may learn a criterion on which speech is to be output depending on the text based on the learning data. Also, the model learning unit 1114 may perform learning by using a learning model for outputting a speech according to a text as the learning data. In this case, the data learning model may include a pre-established model. For example, the data learning model may include a model pre-built by receiving basic learning data (e.g., a sample image).

The data learning model may be built in consideration of an application of the learning model, a purpose of the learning, computer performance of an apparatus, or the like. The data learning model may include, for example, a model based on a neural network. For example, a model such as Deep Neural Network (DNN), Recurrent Neural Network (RNN), Long Short-Term Memory models (LSTM), Bidirectional Recurrent Deep Neural Network (BRDNN), and Convolutional Neural Network (CNN) may be used as the data learning model. However, the present invention is not limited thereto.

According to various embodiments, when a plurality of pre-built data learning models are present, the model learning unit 1114 may determine a data learning model having a large correlation between the input learning data and the basic learning data as a data learning model to be learned. In this case, the basic learning data may be pre-classified for each data type, and the data learning model may be pre-built for each data type. For example, the basic learning data may be pre-classified according to various criteria such as a region where the learning data is generated, a time when the learning data is generated, the size of the learning data, the genre of the learning data, the creator of the learning data, the types of objects in the learning data, etc.

Also, the model learning unit 1114 may train the data learning model using, for example, a learning algorithm including error back propagation or gradient descent.

Also, the model learning unit 1114 may learn the data learning model through, for example, supervised learning having the learning data as an input value.

Also, by self-learning the type of data necessary for situation determination without any supervision, the model learning unit 1114 may learn the data learning model through, for example, unsupervised learning that finds a criterion for the situation determination. Also, the model learning unit 1114 may learn the data learning model through, for example, reinforcement learning using feedback to whether the result of the situation determination according to the learning is correct.

Also, when the data learning model is learned, the model learning unit 1114 may store the learned data learning model. In this case, the model learning unit 1114 may store the learned data learning model in a memory of an electronic apparatus including the data recognition unit 1120. Alternatively, the model learning unit 1114 may store the learned data learning model in a memory of a server connected to an electronic apparatus over a wired or wireless network.

In this case, for example, instructions or data associated with at least one another element of the electronic apparatus may also be stored in the memory where the learned data learning model is stored. Also, the memory may store software and/or a program. The program may include, for example, a kernel, middleware, an application, an application programming interface (API), and/or an application program (or an "application"), The model evaluation unit 1115 inputs evaluation data to the data learning model. When a result output from the evaluation data does not satisfy a predetermined criterion, the model evaluation unit 1115 may allow the model learning unit 1114 to perform learning again. In this case, the evaluation data may include data predetermined to evaluate the data learning model.

For example, the model evaluation unit 1115 may evaluate that the predetermined criterion is not satisfied when the number or ratio of pieces of the evaluation data which are incorrect for a recognition result with respect to a result of the evaluation data by the learned data learning model exceeds a predetermined threshold. For example, when the predetermined criterion is defined as a ratio of 2% and the learned data learning model outputs incorrect recognition results for more than 20 pieces of evaluation data out of a total of 1000 pieces of evaluation data, the model evaluation unit 1115 may evaluate that the learned data learning model is not appropriate.

Meanwhile, when a plurality of learned data learning models are present, the model evaluation unit 1115 may evaluate whether each of the learned video learning model satisfies a predetermined criterion and may determine a model satisfying the predetermined criterion as a final data learning model. In this case, when a plurality of models satisfy the predetermined criterion, the model evaluation unit 1115 may determine any predetermined model or a predetermined number of models as the final data learning model in order of highest to lowest evaluation scores.

Meanwhile, at least one of the data acquiring unit 1111, the pre-processing unit 1112, the learning data selecting unit 1113, the model learning unit 1114, or the model evaluation unit 1115 in the data learning unit 1110 may be manufactured in the form of at least one hardware chip and mounted on an electronic apparatus. For example, at least one of the data acquiring unit 1111, the pre-processing unit 1112, the learning data selecting unit 1113, the model learning unit 1114, or the model evaluation unit 1115 may be manufactured in the form of an AI-dedicated hardware chip or a portion of a conventional general-purpose processor (e.g., a CPU or an application processor) or a graphics processor (e.g., a GPU) and thus may be mounted on various electronic apparatuses that have been described above.

Also, the data acquiring unit 1111, the pre-processing unit 1112, the learning data selecting unit 1113, the model learning unit 1114, and the model evaluation unit 1115 may be mounted on any electronic apparatus or separate electronic apparatuses. For example, some of the data acquiring unit 1111, the pre-processing unit 1112, the learning data selecting unit 1113, the model learning unit 1114, and the model evaluation unit 1115 may be included in an electronic apparatus, and the others may be included in a server.

Also, at least one of the data acquiring unit 1111, the pre-processing unit 1112, the learning data selecting unit 1113, the model learning unit 1114, or the model evaluation unit 1115 may be implemented as a software module. When at least one of the data acquiring unit 1111, the pre-processing unit 1112, the learning data selecting unit 1113, the model learning unit 1114 or the model evaluation unit 1115 is implemented as a software module (or a program module including instructions), the software module may be stored in a non-transitory computer-readable medium. Also, in this case, at least one software module may be provided by an OS or may be provided by a predetermined application. Unlike this, some of the at least one software module may be provided by an operating system (OS), and the others may be provided by a predetermined application.

The data recognition unit 1120 according to an embodiment of the present disclosure may include a data acquiring unit 1121, a pre-processing unit 1122, a recognition data selecting unit 1123, a recognition result providing unit 1124, and a model updating unit 1125.

The data acquiring unit 1121 may acquire a text necessary to output a speech. On the contrary, the data acquiring unit 1121 may acquire a speech necessary to output a text. The pre-processing unit 1122 may pre-process the acquired data such that the data acquired to output the speech or text can be used. The pre-processing unit 1122 may process the acquired data in a predetermined format such that the recognition result providing unit 1124 to be described below can use the data acquired to output the speech or text.

The recognition data selecting unit 1123 may select data necessary to output the speech or text from the pre-processed data. The selected data may be provided to the recognition result providing unit 1124. The recognition data selecting unit 1123 may select all or some of the preprocessed data according to a predetermined criterion for outputting the speech or text. Also, the recognition data selecting unit 1123 may select data according to the predetermined criterion through learning by the model learning unit 1114.

The recognition result providing unit 1124 may output a speech or text by applying the selected data to the data learning model. The recognition result providing unit 1124 may apply the selected data to the data learning model by using the data selected by the recognition data selecting unit 1123 as an input value. Also, the recognition result may be determined by the data learning model.

The model updating unit 1125 may enable the data learning model to be updated based on the evaluation of the recognition result provided by the recognition result providing unit 1124. For example, the model updating unit 1125 may enable the model learning unit 1114 to update the data learning model by providing the recognition result provided by the recognition result providing unit 1124 to the model learning unit 1114.

Meanwhile, at least one of the data acquiring unit 1121, the pre-processing unit 1122, the recognition data selecting unit 1123, the recognition result providing unit 1124, or the model updating unit 1125 in the data recognition unit 1120 may be manufactured in the form of at least one hardware chip and mounted on an electronic apparatus. For example, at least one of the data acquiring unit 1121, the pre-processing unit 1122, the recognition data selecting unit 1123, the recognition result providing unit 1124, or the model updating unit 1125 may be manufactured in the form of an AI-dedicated hardware chip or a portion of a conventional general-purpose processor (e.g., a CPU or an application processor) or a graphics processor (e.g., a GPU) and thus may be mounted on various electronic apparatuses that have been described above.

Also, the data acquiring unit 1121, the pre-processing unit 1122, the recognition data selecting unit 1123, the recognition result providing unit 1124, and the model updating unit 1125 may be mounted on any electronic apparatus or separate electronic apparatuses. For example, some of the data acquiring unit 1121, the pre-processing unit 1122, the recognition data selecting unit 1123, the recognition result providing unit 1124, and the model updating unit 1125 may be included in an electronic apparatus, and the others may be included in a server.

Also, at least one of the data acquiring unit 1121, the pre-processing unit 1122, the recognition data selecting unit 1123, the recognition result providing unit 1124, and the model updating unit 1125 may be implemented as a software module. When at least one of the data acquiring unit 1121, the pre-processing unit 1122, the recognition data selecting unit 1123, the recognition result providing unit 1124, or the model updating unit 1125 is implemented as a software module (or a program module including instructions), the software module may be stored in a non-transitory computer-readable medium. Also, in this case, at least one software module may be provided by an OS or may be provided by a predetermined application. Unlike this, some of the at least one software module may be provided by an operating system (OS), and the others may be provided by a predetermined application.

In general, a user terminal providing the text-to-speech synthesis system and the text-to-speech synthesis service described herein may also represent various types of devices, such as wireless telephones, cellular telephones, laptop computers, wireless multimedia devices, wireless communication personal computer (PC) cards, PDAs, external modems, internal modems, devices in communication over a wireless channel, etc. The device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have hardware, software, firmware, or combinations thereof as well as memory for storing instructions and data.

The techniques described herein may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design constraints imposed on the particular application and the overall system. Those skilled in the art may implement the described functions in varying ways for each particular application, but such decisions for implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described herein, computer, or a combination thereof.

Accordingly, various example logic blocks, modules, and circuits described in connection with the disclosure herein may be implemented or performed with general purpose processors, DSPs, ASICs, FPGAs or other programmable logic devices, discrete gate or transistor logic, discrete hardware components, or any combination of those designed to perform the functions described herein. A general purpose processor may be a microprocessor, but in the alternative, the processor may be any conventional processor, controller, microcontroller, or state machine. The processor may also be implemented as a combination of computing devices, for example, a DSP and microprocessor, a plurality of microprocessors, one or more microprocessors associated with a DSP core, or any other combination of such configurations.

In the implementation using firmware and/or software, the techniques may be implemented with instructions stored on a computer readable medium, such as random access memory (RAM), read-only memory (ROM), non-volatile random access memory (NVRAM), programmable read-only memory (PROM), erasable programmable read-only memory (EPROM), electrically erasable PROM (EPMROM), flash memory, compact disc (CD), magnetic or optical data storage devices, etc. The instructions may be executable by one or more processors, and may cause the processor(s) to perform certain aspects of the functions described herein.

When implemented in software, the functions may be stored on a computer readable medium as one or more instructions or codes, or may be transmitted through a computer readable medium. The computer readable medium includes both the computer storage medium and the communication medium including any medium that facilitate the transfer of a computer program from one place to another. The storage media may also be any available media that may be accessed by a computer. By way of non-limiting example, such a computer readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. Also, any connection is properly referred to as a computer readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer readable media.

The software module may reside in RAM memory, flash memory, ROM memory, EPROM memory, EEPROM memory, registers, hard disk, removable disk, CD-ROM, or any other form of storage medium known. An exemplary storage medium may be coupled to the processor, such that the processor may read information from or write information to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

The above description of the present disclosure is provided to enable those skilled in the art to make or use the present disclosure. Various modifications of the present disclosure will be readily apparent to those skilled in the art, and the general principles defined herein may be applied to various modifications without departing from the spirit or scope of the present disclosure. Accordingly, the present disclosure is not intended to be limited to the examples described herein, but is intended to be given the broadest scope consistent with the principles and novel features disclosed herein.

Although example implementations may refer to utilizing aspects of the presently disclosed subject matter in the context of one or more standalone computer systems, the subject matter is not so limited, and they may be implemented in conjunction with any computing environment, such as a network or distributed computing environment. Furthermore, aspects of the presently disclosed subject matter may be implemented in or across a plurality of processing chips or devices, and storage may be similarly influenced across a plurality of devices. Such devices may include PCs, network servers, and handheld devices.

Although the subject matter has been described in language specific to structural features and/or methodological acts, it will be understood that the subject matter defined in the appended claims is not necessarily limited to the specific features or acts described above. Rather, the specific features and acts described above are described as example forms of implementing the claims.

Although the method mentioned herein has been described through specific embodiments, it is possible to implement it as computer readable code on a computer readable recording medium. The computer readable recording medium includes all kinds of recording devices in which data readable by a computer system is stored. Examples of computer readable recording medium include ROM, RAM, CD-ROM, magnetic tape, floppy disk, and optical data storage device, etc. In addition, the computer readable recording medium may be distributed over network coupled computer systems so that the computer readable code is stored and executed in a distributed manner. Further, programmers in the technical field pertinent to the present disclosure will be easily able to envision functional programs, codes and code segments to implement the embodiments.

Although the present disclosure has been described in connection with some embodiments herein, it should be understood that various modifications and changes can be made without departing from the scope of the present disclosure, which can be understood by those skilled in the art to which the present disclosure pertains. In addition, such modifications and changes should be considered within the scope of the claims appended herein.

What is claimed is:

1. A text-to-speech synthesis method using machine learning based on a sequential prosody feature, comprising:
    receiving an input text;
    receiving a sequential prosody feature; and
    generate output speech data for the input text reflecting the received sequential prosody feature by inputting the input text and the received sequential prosody feature to an artificial neural network text-to-speech synthesis model,
    wherein receiving the sequential prosody feature includes receiving a plurality of embedding vectors representing the sequential prosody feature,
    wherein the artificial neural network text-to-speech synthesis model includes an encoder and a decoder,
    wherein the method further includes inputting the received plurality of embedding vectors to an attention module to generate a plurality of converted embedding vectors corresponding to respective parts of the input text provided to the encoder, wherein lengths of the plurality of converted embedding vectors varies with a length of the input text, and
    wherein generating the output speech data for the input text includes:
    inputting the generated plurality of converted embedding vectors to the encoder of the artificial neural network text-to-speech synthesis model, and
    generating output speech data for the input text reflecting the plurality of converted embedding vectors.

2. The text-to-speech synthesis method of claim 1, wherein the artificial neural network text-to-speech synthesis model is generated by performing machine learning based on a plurality of learning texts and data representing learning speeches corresponding to the plurality of learning texts, and
    wherein the data representing the learning speeches includes sequential prosody features of the learning speeches.

3. The text-to-speech synthesis method of claim 1, wherein the sequential prosody feature includes, in chronological order, prosody information corresponding to at least one unit from among frame, character, phoneme, syllable, or word, and
    wherein the prosody information includes at least one of information on a volume of sound, information on a pitch of the sound, information on a length of sound, information on a pause duration of sound, or information on a style of the sound.

4. The text-to-speech synthesis method of claim 3,
    wherein each of the plurality of embedding vectors corresponds to the prosody information included in the chronological order.

5. The text-to-speech synthesis method of claim 1, wherein generating the output speech data for the input text further includes:
    inputting the received plurality of embedding vectors to the decoder of the artificial neural network text-to-speech synthesis model.

6. The text-to-speech synthesis method of claim 4, further comprising receiving an articulatory feature of a speaker,
    wherein generating the output speech data for the input text includes generating output speech data for the input text, which simulates speech of the speaker and reflects a plurality of embedding vectors representing the sequential prosody feature.

7. The text-to-speech synthesis method of claim 6, wherein receiving the articulatory feature of the speaker includes receiving a sequential prosody feature of the speaker,
    wherein receiving the plurality of embedding vectors includes normalizing the received plurality of embedding vectors based on the sequential prosody feature of the speaker, and
    wherein generating the output speech data for the input text includes generating the output speech data for the input text, which simulates the speech of the speaker and reflects the normalized plurality of embedding vectors.

8. The text-to-speech synthesis method of claim 7, wherein normalizing the received plurality of embedding vectors includes:
    calculating an average value of embedding vectors representing the sequential prosody feature of the speaker at each time-step, and
    subtracting the received plurality of embedding vectors by the average value of the embedding vectors calculated at each time-step.

9. The text-to-speech synthesis method of claim 1, wherein receiving the sequential prosody feature includes receiving prosody information on at least a part of the input text through a user interface, and
    wherein generating the output speech data for the input text reflecting the received sequential prosody feature includes generating output speech data for the input text reflecting the prosody information on at least the part of the input text.

10. The text-to-speech synthesis method of claim 9, wherein the prosody information on at least the part of the input text is input through a tag provided in a speech synthesis markup language.

11. The text-to-speech synthesis method of claim 1, further comprising:
    receiving prosody information on at least a part of the input text through a user interface; and changing the received sequential prosody feature based on the received prosody information on at least a part of the input text, wherein generating the output speech data for the input text reflecting the received sequential prosody feature includes generating output speech data for the input text reflecting the changed sequential prosody feature.

12. The text-to-speech synthesis method of claim 11, wherein the prosody information on the at least the part of the input text, which is used to change the received sequential prosody feature, is input through a tag provided in a speech synthesis markup language.

13. A non-transitory computer-readable storage medium having a program recorded thereon, the program comprising instructions of performing operations of the text-to-speech synthesis method using machine learning based on the sequential prosody feature of claim 1.

* * * * *